United States Patent
Yamada et al.

(10) Patent No.: US 11,055,045 B2
(45) Date of Patent: Jul. 6, 2021

(54) COMPUTER-READABLE MEDIUM, IMAGE FORMING APPARATUS, AND SYSTEM FOR COMMUNICATING DIFFERENT TYPES OF DATA

(71) Applicant: BROTHER KOGYO KABUSHIKI KAISHA, Aichi (JP)

(72) Inventors: Kazutaka Yamada, Nagakute (JP); Akihiro Hayashi, Komaki (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 0 days.

(21) Appl. No.: 16/291,116

(22) Filed: Mar. 4, 2019

(65) Prior Publication Data
US 2019/0303079 A1    Oct. 3, 2019

(30) Foreign Application Priority Data

Mar. 28, 2018 (JP) .............................. JP2018-061554
Mar. 29, 2018 (JP) .............................. JP2018-063389

(51) Int. Cl.
*G06F 15/00* (2006.01)
*G06F 3/12* (2006.01)

(52) U.S. Cl.
CPC .......... *G06F 3/1259* (2013.01); *G06F 3/1207* (2013.01); *G06F 3/1236* (2013.01); *G06F 3/1294* (2013.01)

(58) Field of Classification Search
CPC .... G06F 3/1259; G06F 3/1207; G06F 3/1236; G06F 3/1294
(Continued)

(56) References Cited

U.S. PATENT DOCUMENTS 7,839,514 B2 * 11/2010 Tsuchie .............. G03G 15/5091
358/1.14
2010/0328707 A1 * 12/2010 Miyake ................. G06F 3/1232
358/1.15
(Continued)

FOREIGN PATENT DOCUMENTS

JP    2004-102832 A    4/2004
JP    2016-021221 A    2/2016
(Continued)

*Primary Examiner* — Mark R Milia
(74) *Attorney, Agent, or Firm* — Scully, Scott, Murphy & Presser, PC

(57) ABSTRACT

A non-transitory computer-readable medium stores computer-readable instructions that are executable by a processor coupled with an information processing device. The information processing device includes a physical communication interface including a first logical interface and a second logical interface. The instructions are configured to, when executed by the processor, cause the information processing device to, in response to receiving an image forming instruction from an operating system, generate preparation information instructing an image forming apparatus to perform a preparation operation, which is an operation to be performed in advance of image formation based on image forming data, transmit the preparation information to the image forming apparatus via the first logical interface, which is configured to communicate data other than the image forming data, and generate the image forming data to be transmitted to the image forming apparatus via the second logical interface, in accordance with the image forming instruction.

14 Claims, 15 Drawing Sheets

(58) Field of Classification Search
USPC .......................................................... 358/1.15
See application file for complete search history.

(56) References Cited

U.S. PATENT DOCUMENTS

2015/0371117 A1  12/2015  Ooba
2017/0223210 A1   8/2017  Yamada

FOREIGN PATENT DOCUMENTS

JP     2017-047590 A    3/2017
JP     2017-134718 A    8/2017

* cited by examiner

COMPUTER-READABLE MEDIUM, IMAGE FORMING APPARATUS, AND SYSTEM FOR COMMUNICATING DIFFERENT TYPES OF DATA

CROSS-REFERENCE TO RELATED APPLICATION

This application claims priority under 35 U.S.C. § 119 from Japanese Patent Applications No. 2018-061554 filed on Mar. 28, 2018 and No. 2018-063389 filed on Mar. 29, 2018. The entire subject matter of the applications is incorporated herein by reference.

BACKGROUND

Technical Field

Aspects of the present disclosure are related to a non-transitory computer-readable medium, an image forming apparatus, and a system for communicating different types of data including image forming data.

Related Art

A technology has been known in which a print data generator transmits, to an image forming apparatus, instruction information for instructing the image forming apparatus to perform a preparation process to prepare for image formation, prior to generating print data. According to the known technology, it is possible to shorten a period of time required until image formation based on the print data is started.

Further, a technology has been known in which a server, connected with an image forming apparatus via a network, manages information such as the number of sheets printed by the image forming apparatus.

SUMMARY

In the meantime, in the known technology for the server to manage the number of the printed sheets, the server may monitor print data received by the image forming apparatus, in order to count the number of the printed sheets. In this case, there is a potential risk that when the image forming apparatus receives instruction information as mentioned above, the server might erroneously recognize the received instruction information as print data.

Aspects of the present disclosure are advantageous to provide one or more improved techniques that make it possible for a server to accurately count the number of sheets printed by an image forming apparatus.

According to aspects of the present disclosure, a non-transitory computer-readable medium is provided, which stores computer-readable instructions that are executable by a processor coupled with an information processing device. The information processing device includes a physical communication interface including a first logical interface and a second logical interface. The instructions are configured to, when executed by the processor, cause the information processing device to, in response to receiving an image forming instruction from an operating system of the information processing device, generate preparation information instructing an image forming apparatus to perform a preparation operation, the preparation operation being an operation to be performed in advance of image formation based on image forming data, transmit the generated preparation information to the image forming apparatus via the first logical interface, the first logical interface being configured to communicate data other than the image forming data, and generate the image forming data to be transmitted to the image forming apparatus via the second logical interface, in accordance with the image forming instruction.

According to aspects of the present disclosure, further provided is an image forming apparatus including an image former configured to perform image formation based on image forming data, a physical communication interface including a first logical interface configured to communicate data other than the image forming data, and a second logical interface configured to communicate the image forming data, and a controller configured to, in response to receiving preparation information via the first logical interface, cause the image former to perform a preparation operation, the preparation operation being an operation to be performed in advance of the image formation, and in response to receiving the image forming data via the second logical interface, cause the image former to perform the image formation based on the received image forming data.

According to aspects of the present disclosure, further provided is a system including an image forming apparatus configured to perform image formation based on image forming data, and an information processing device. The information processing device includes a first physical communication interface including a first logical interface configured to communicate data other than the image forming data and a second logical interface configured to communicate the image forming data, a first controller configured to, in response to receiving an image forming instruction from an operating system of the information processing device, generate preparation information instructing the image forming apparatus to perform a preparation operation, the preparation operation being an operation to be performed in advance of the image formation, transmit the generated preparation information to the image forming apparatus via the first logical interface, and generate the image forming data to be transmitted to the image forming apparatus via the second logical interface, in accordance with the image forming instruction. The image forming apparatus includes an image former, a second physical communication interface including a third logical interface configured to communicate data other than the image forming data and a fourth logical interface configured to communicate the image forming data, and a second controller configured to, in response to receiving the preparation information from the information processing device via the third logical interface, cause the image forming apparatus to perform the preparation operation, and in response to receiving the image forming data from the information processing device via the fourth logical interface, cause the image former to perform the image formation based on the received image forming data.

BRIEF DESCRIPTION OF THE ACCOMPANYING DRAWINGS

FIG. 1 schematically shows a configuration of a printing system in a first illustrative embodiment according to one or more aspects of the present disclosure.

FIG. 2 schematically shows another configuration of the printing system in the first illustrative embodiment according to one or more aspects of the present disclosure.

Figure 12:
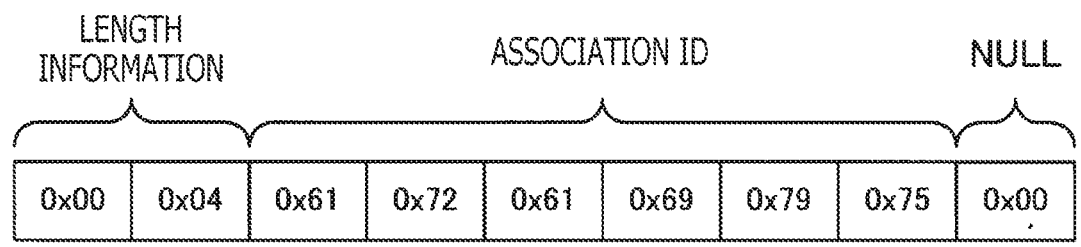

FIG. 12 exemplifies an association ID included in a preceding command, in the third illustrative embodiment according to one or more aspects of the present disclosure.

Figure 13:
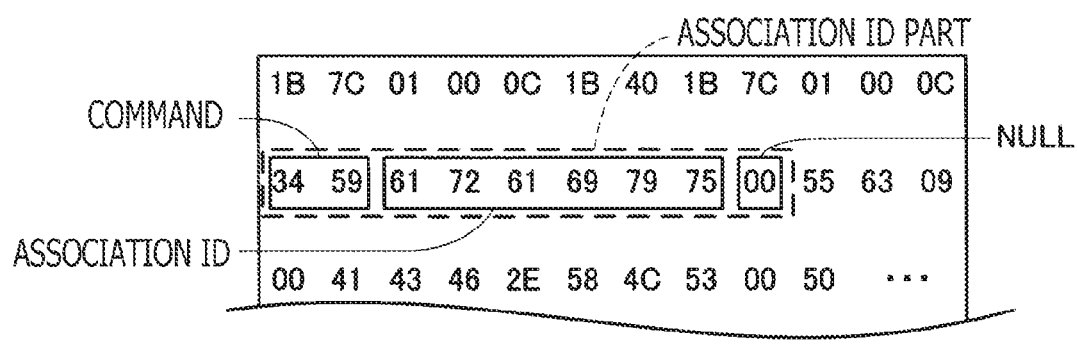

FIG. 13 exemplifies an association ID included in a print job, in the third illustrative embodiment according to one or more aspects of the present disclosure.

Figure 14A:
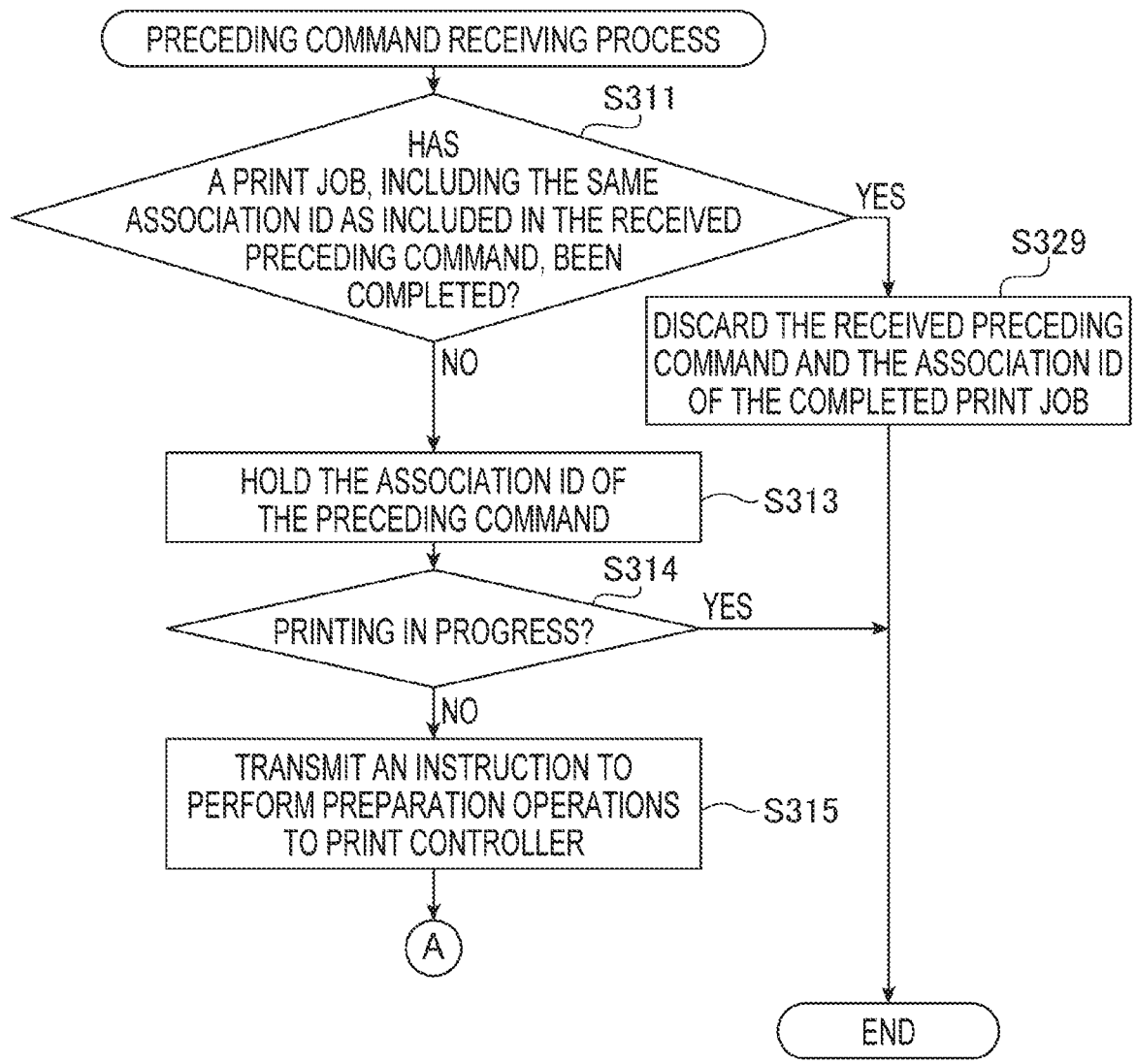
Figure 14B:
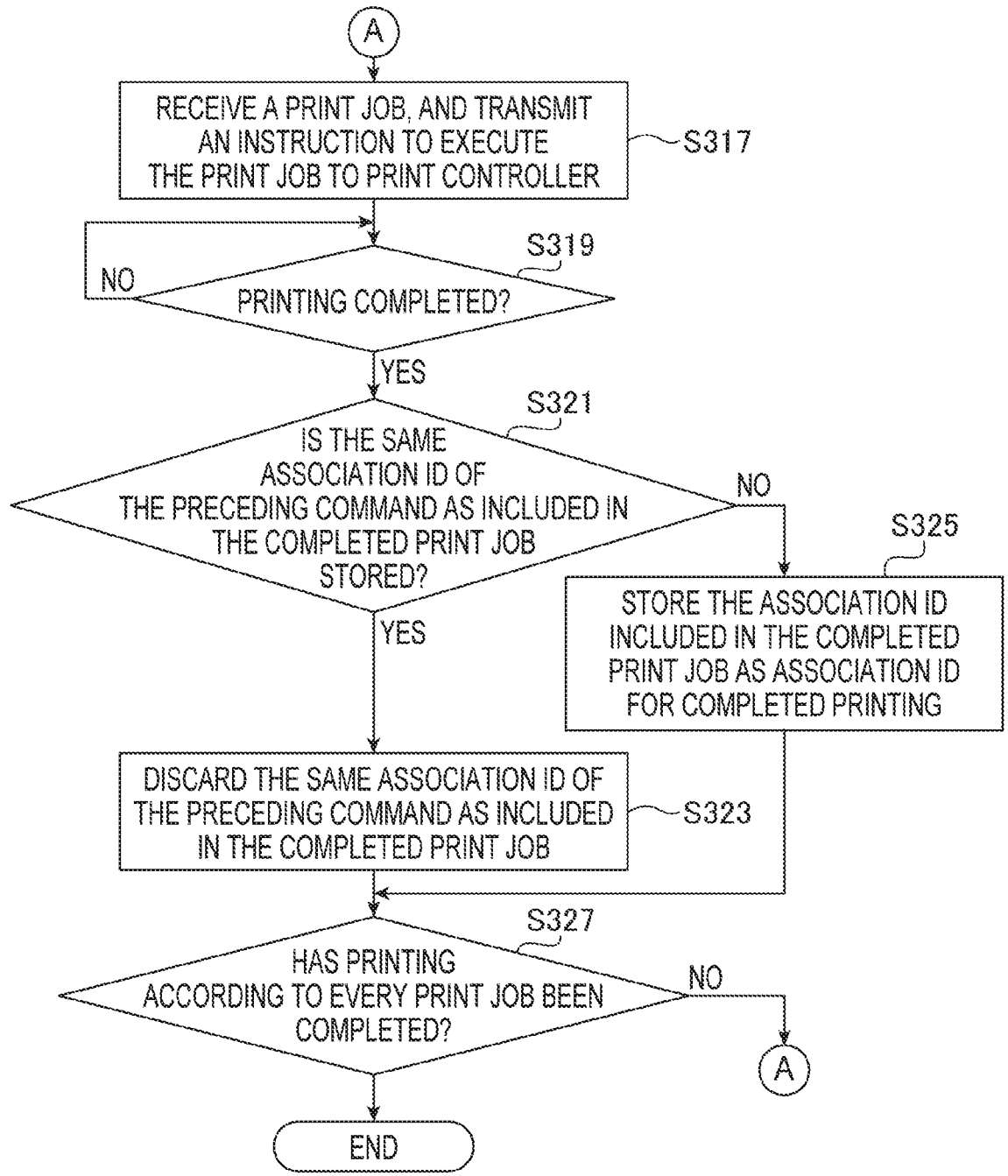

FIGS. 14A and 14B are flowcharts showing a procedure of a preceding command receiving process in the third illustrative embodiment according to one or more aspects of the present disclosure.

Figure 15:
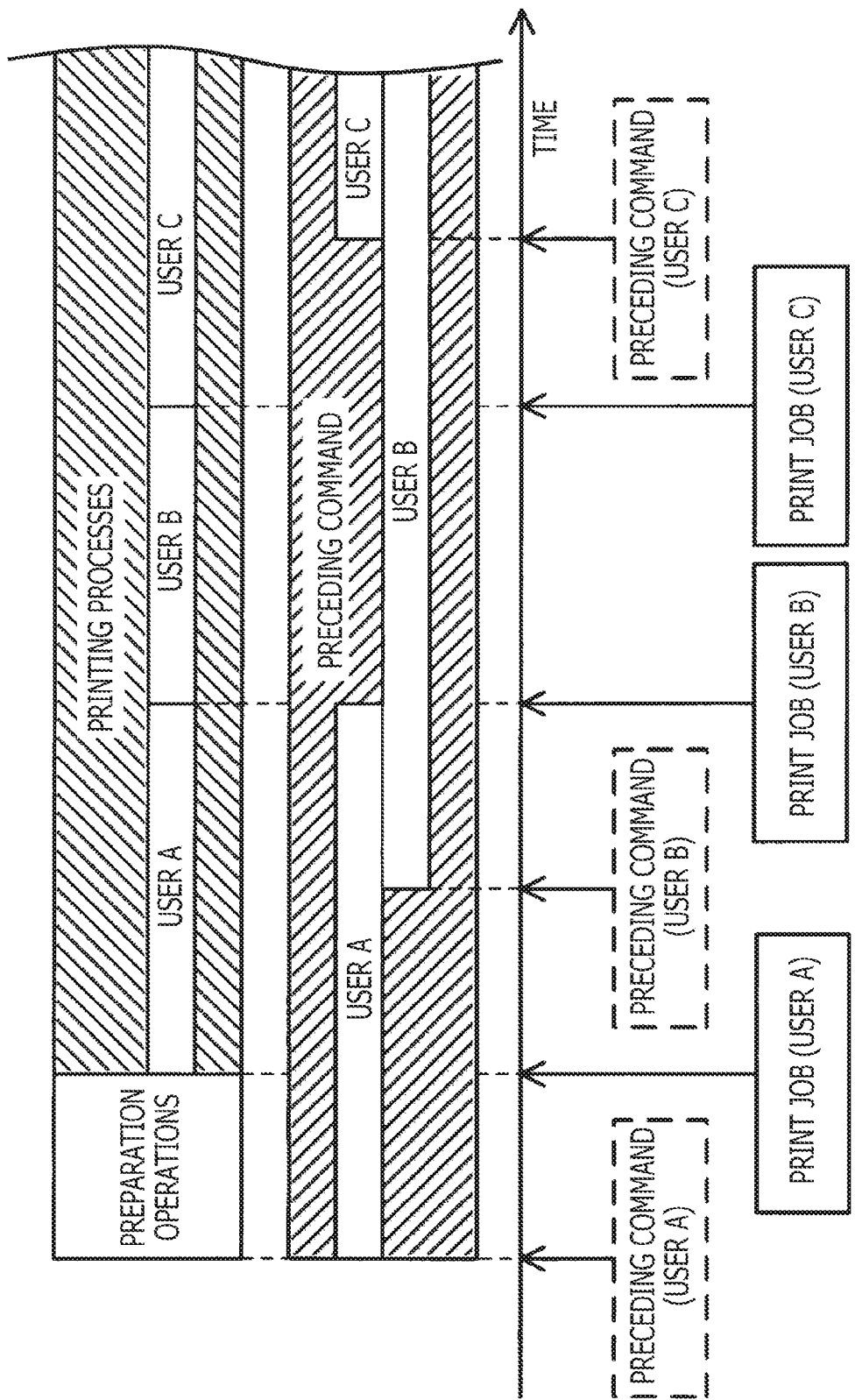

FIG. 15 is a timing chart exemplifying a relationship among timings at which the MFP receives each preceding command and each print job, starts and ends each printing process, and stores each association ID into a management information base (hereinafter referred to as an "MIB"), in the third illustrative embodiment according to one or more aspects of the present disclosure.

Figure 16A:
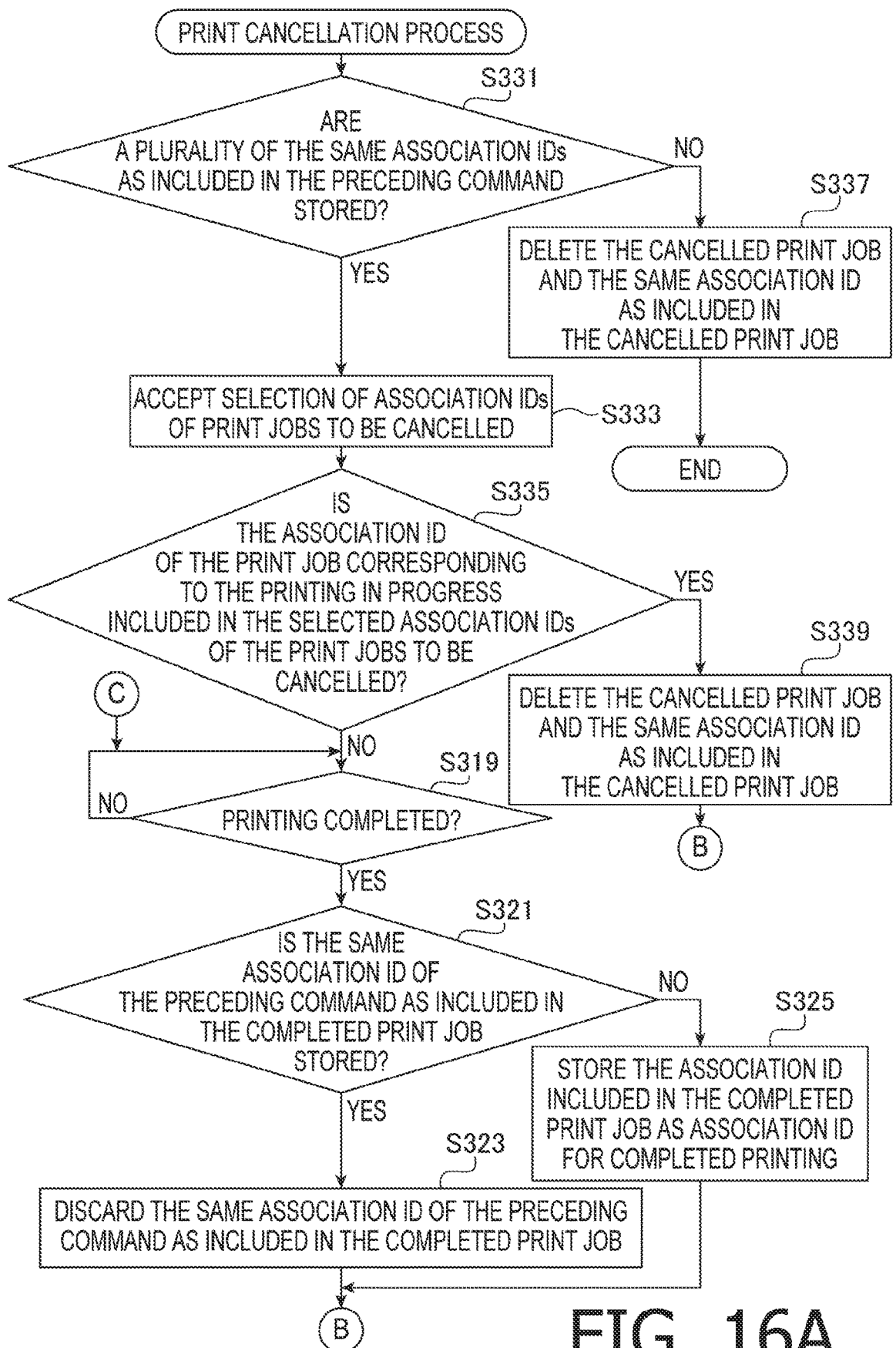
Figure 16B:
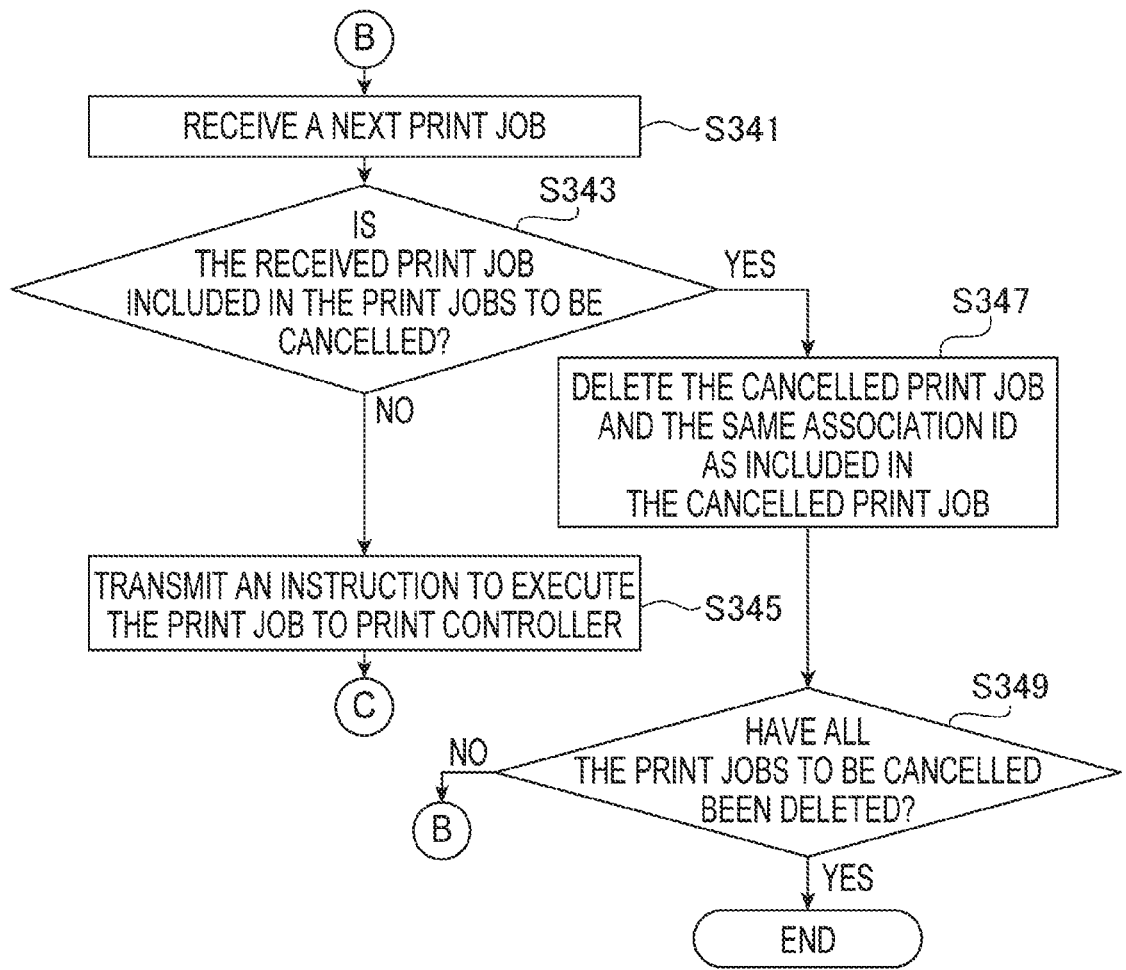

FIGS. 16A and 16B are flowcharts showing a procedure of a print cancellation process in the third illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings.

First Illustrative Embodiment

A general overview of printing systems 1 in a first illustrative embodiment according to aspects of the present disclosure will be described with reference to FIGS. 1 and 2. A printing system 1A shown in FIG. 1 includes an information management server 70, a PC 10, and a multi-function peripheral (hereinafter referred to as an "MFP") 50 that are interconnected via a network 40. The PC 10 generates a print job, and transmits the generated print job to the MFP 50 via the information management server 70. Namely, the MFP 50 receives the print job from the PC 10 via the information management server 70. The MFP 50 has a plurality of functions such as a printing function to form an image on a sheet and a scanning function to scan a document sheet and generate scanned data of the document sheet. The MFP 50 performs a printing process to form an image on a sheet in accordance with the print job transmitted by the PC 10. It is noted that hereinafter, "forming an image on a sheet" may be simply expressed as "printing." The information management server 70 monitors the print job received by the MFP 50 from the PC 10, and manages the number of sheets printed by the MFP 50. For instance, there may be a service in which a user is allowed to use the MFP 50 for a particular period of time during which a usage fee is charged according to the number of sheets printed by the user. In order to realize this kind of service, the information management server 70 may be configured to count the number of sheets printed by the MFP 50 based on the print job. A printing system 1B shown in FIG. 2 includes the PC 10 and the MFP 50 interconnected via a USB cable 41. In this case, the PC 10 may store therein an information management program 90 for achieving a function equivalent to the function of the information management server 70. Specifically, the information management program 90 may be configured to, when executed by the PC 10, cause the PC 10 to monitor the print job transmitted by the PC 10 via the USB cable 41. It is noted that the information management program 90 may be stored and executed by the MFP 50. In this case, the information management program 90 may be configured to, when executed by the MFP 50, cause the MFP 50 to monitor the print job received by the MFP 50 via the USB cable 41. Further, it is noted that, in the printing system 1B with the information management program 90 executable by the PC 10 or the MFP 50, the PC 10 and the MFP 50 may perform communication with each other via the network 40, instead of communication via the USB cable 41. Further, specifically, the network 40 may be a LAN.

Figure 3:
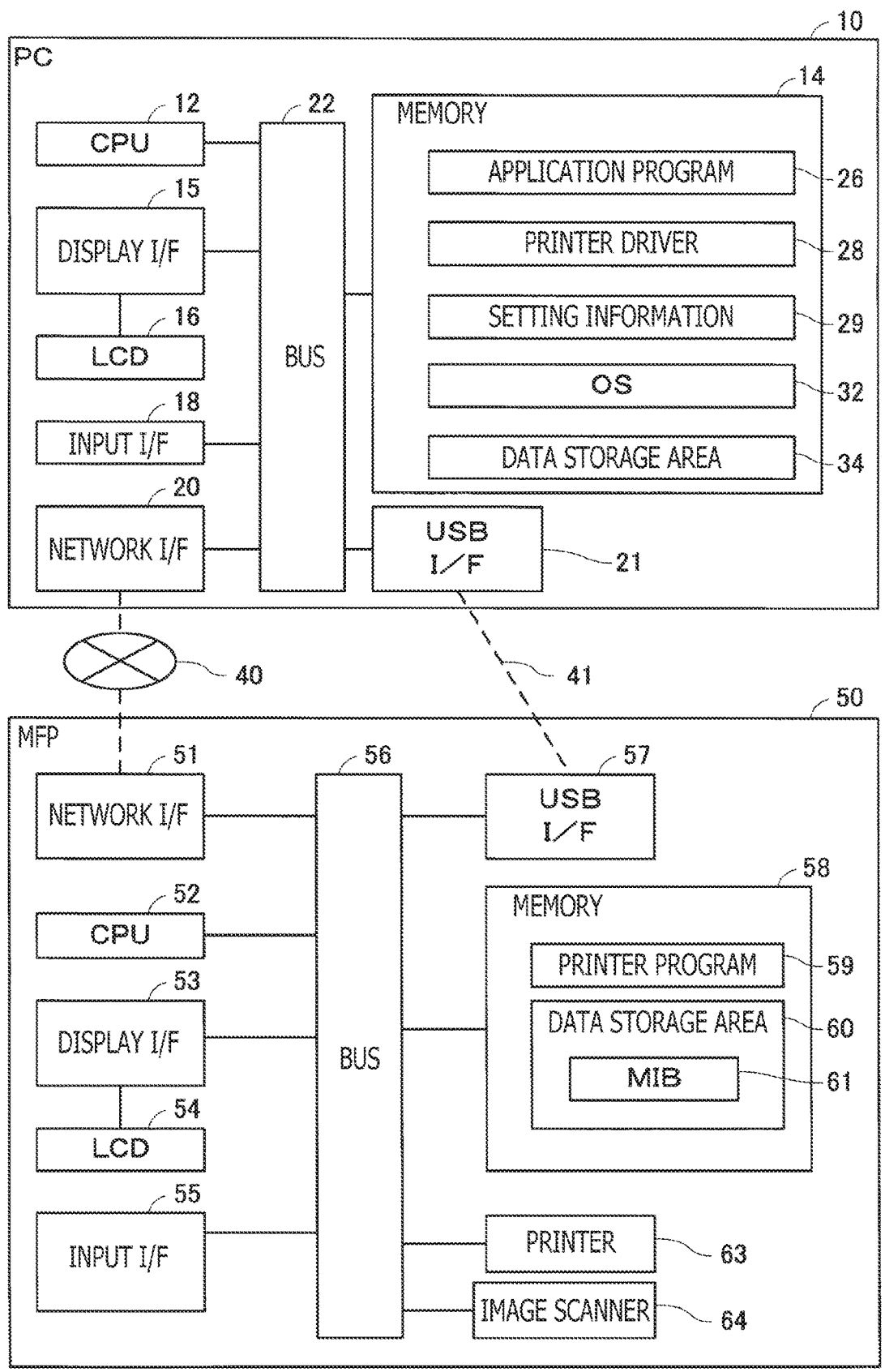
FIG. 3 is a block diagram schematically showing configurations of a PC and a multi-function peripheral (hereinafter referred to as an "MFP") included in the printing system in the first illustrative embodiment according to one or more aspects of the present disclosure.

Subsequently, configurations of the PC 10 and the MFP 50 will be described with reference to FIG. 3. The PC 10 includes a CPU 12, a memory 14, a display I/F ("I/F" is an abbreviation of "interface") 15, an LCD 16, an input I/F 18, a network I/F 20, and a USB I/F 21. These elements included in the PC 10 are communicably interconnected via a bus 22.

The CPU 12 is configured to perform processes in accordance with an application program 26, a printer driver 28, and an operating system (hereinafter referred to as an "OS") 32 that are stored in the memory 14. For instance, the application program 26 may include a document creation program with which data generated is printable by the MFP 50.

The printer driver 28 is a device driver for the MFP 50 and is configured to generate a print job executable by the MFP 50. The OS 32 is a program configured to provide basic functions usable by the application program 26 and the printer driver 28. It is noted that, in the following description, the CPU 12 executing a program (e.g., the application program 26) may be simply referred to as a name of the program. For instance, what is referred to as "the application program 26" in the following description may denote "the CPU 12 executing the application program 26."

The memory 14 stores setting information 29. For instance, the setting information 29 may be generated when the printer driver 28 is installed into the PC 10. The setting information 29 includes print port information. The print port information includes identification information for identifying the MFP 50, information on a communication interface for connecting the PC 10 with the MFP 50, and information on a communication protocol used for communication with the MFP 50.

The memory 14 has a data storage area 34. The data storage area 34 is configured to store data necessary for executing the application program 26. Further, the data storage area 34 stores one or more programs (not shown) for causing the PC 10 to serve as an SNMP ("SNMP" is an abbreviation of "Simple Network Management Protocol") manager. Thus, the PC 10 functions as an SNMP manager. The memory 14 may include a combination of at least two of storage media such as a RAM, a ROM, a flash memory, an HDD, and a buffer of the CPU 12.

The memory 14 may include at least one of non-transitory computer-readable storage media including but not limited to recording media such as CD-ROMs and DVD-ROMs as well as the aforementioned storage media. The non-transitory media are tangible media. Meanwhile, electric signals carrying programs downloaded from servers on the Internet are considered to be included in computer-readable media but not included in the non-transitory computer-readable storage media. The same applies to a below-mentioned memory 58 of the MFP 50.

The LCD 16 is configured to display various types of information about the PC 10. The LCD 16 is connected with the bus 22 via the display I/F 15. The LCD 16 acquires display data via the display I/F 15. The input I/F 18 is an interface configured to accept user operations therethrough. The input I/F 18 may include, but are not limited to, a keyboard and a mouse. For instance, the input I/F 18 may include a film-like touch sensor overlaid on a display screen of the LCD 16.

The network I/F 20 has a LAN receptacle (not shown) and a wireless LAN communication unit (not shown). Namely, the network I/F 20 is a physical interface configured to perform communication using a TCP/IP protocol via the network 40. It is noted that the network 40 may include a wired LAN and a wireless LAN. The USB I/F 21 has a USB receptacle. The USB I/F 21 is a physical interface configured to perform communication according to a USB standard (e.g., USB 2.0).

The MFP 50 includes a network I/F 51, a CPU 52, a display I/F 53, an LCD 54, an input I/F 55, a USB I/F 57, a memory 58, a printer 63, and an image scanner 64. These elements included in the MFP 50 are communicably interconnected via a bus 56.

The CPU 52 performs processes according to a printer program 59 stored in the memory 58. The printer program 59 is for comprehensively controlling the MFP 50. Further, the memory 58 stores one or more programs (not shown) for causing the MFP 50 to serve as an SNMP agent. Thus, the MFP 50 functions as an SNMP agent. Further, the memory 58 stores an EWS ("EWS" is an abbreviation of "Embedded Web Server") program (not shown) for causing the MFP 50 to serve as a Web server. Thus, the MFP 50 functions as a Web server. The memory 58 may include a combination of at least two of storage media such as a RAM and a ROM. Further, the memory 58 has a data storage area 60. The data storage area 60 is configured to store data necessary for executing the printer program 59.

Further, the data storage area 60 stores therein a management information base (hereinafter referred to as an "MIB") 61. The MIB 61 includes management information for managing settings and/or a state of the MFP 50. Specifically, for instance, the management information may include information as to whether a specific setting is valid, which is a setting for bringing the MFP 50 into a sleep state as a power-saving mode when the MFP 50 does not perform a printing process after having been powered on. Further, the management information may include information as to whether the printing process is in execution. Further, information set with the EWS function is stored in the MIB 61. Specifically, an administrator may activate a browser on a PC connected with the network 40 and input an IP address of the MFP 50 via the browser. The MFP 50 may provide a setting screen for accepting settings input therethrough. The information included in the MIB 61 may be updated based on setting values input by the administrator via the setting screen.

For instance, the network I/F 51 has a LAN receptacle (not shown) and a wireless LAN communication unit (not shown). Namely, the network I/F 51 is a physical interface configured to perform communication using a TCP/IP protocol via the network 40. It is noted that the network 40 may include a wired LAN and a wireless LAN. The USB I/F 57 has a USB receptacle. For instance, the USB I/F 57 is a physical interface configured to perform communication according to a USB standard (e.g., USB 2.0).

The printer 63 includes a head (not shown), a plurality of nozzles (not shown), and a cap (not shown). The nozzles are attached to the head. The printer 63 is configured to discharge ink supplied from an ink cartridge (not shown) from the nozzles onto a sheet, thereby forming an image on the sheet. The cap is configured to cover the nozzles when the MFP 50 is in a standby state. Thus, it is possible to prevent unnecessary drying of ink. When the MFP 50 is in a print waiting state, the cap is removed in such a manner that the nozzles are exposed. For instance, the image scanner 64 includes an image sensor, and is configured to scan an image formed on a document sheet and generate scanned data of the image.

The LCD 54 is configured to display various types of information on the MFP 50. The LCD 54 is connected with the bus 56 via the display I/F 53. The LCD 54 acquires display data via the display I/F 53. The input I/F 55 is an interface configured to accept user operations therethrough.

The PC 10 and the MFP 50 are communicably interconnected via the network 40. Further, the PC 10 and the MFP 50 may be communicably connected with each other via the USB cable 41.

Subsequently, referring to FIG. 4, communication between the PC 10 and the MFP 50 via the network 40 will be described. The PC 10 has, as logical interfaces, a Port 9100 I/F 71A, an LPR I/F 72A, an IPP I/F 73A, and an SNMP I/F 74A. Further, the MFP 50 has, as logical interfaces, a Port 9100 I/F 71B, an LPR I/F 72B, an IPP I/F 73B, and an SNMP I/F 74B. The Port 9100 I/F 71A, the LPR I/F 72A, the IPP I/F 73A, and the SNMP I/F 74A are logical interfaces to perform communication via the network I/F 20 by using a Port 9100 protocol, an LPR protocol, an IPP protocol, and an SNMP protocol, respectively. Further, the Port 9100 I/F 71B, the LPR I/F 72B, the IPP I/F 73B, and the SNMP I/F 74B are logical interfaces to perform communication via the network I/F 51 by using the Port 9100 protocol, the LPR protocol, the IPP protocol, and the SNMP protocol, respectively. The Port 9100 I/Fs 71A and 71B, the LPR I/Fs 72A and 72B, and the IPP I/Fs 73A and 73B are configured to communicate the print job therethrough. The SNMP I/F 74A and 74B are configured to communicate therethrough a request for information included in the MIB 61 and a response to the request, and a request for updating information included in the MIB 61 and a response to the request. In response to a request from the printer driver 28, the OS 32 performs data communication between the printer driver 28 and the Port 9100 I/F 71A, the LPR I/F 72A, or the IPP I/F 73A. Meanwhile, data communication between the printer driver 28 and the SNMP I/F 74A is performed by the printer driver 28. In response to receiving a print job transmitted via the Port 9100 I/F 71A, the LPR I/F 72A, or the IPP I/F 73A, the information management server 70 counts the number of printed sheets based on the received print job. Meanwhile, data communication via the SNMP I/Fs 74A and 74B is performed directly between the PC 10 and the MFP 50, without involving the information management server 70. Therefore, a preceding command communicated via the SNMP I/Fs 74A and 74B is never erroneously recognized as a print job by the information management server 70.

Figure 5:
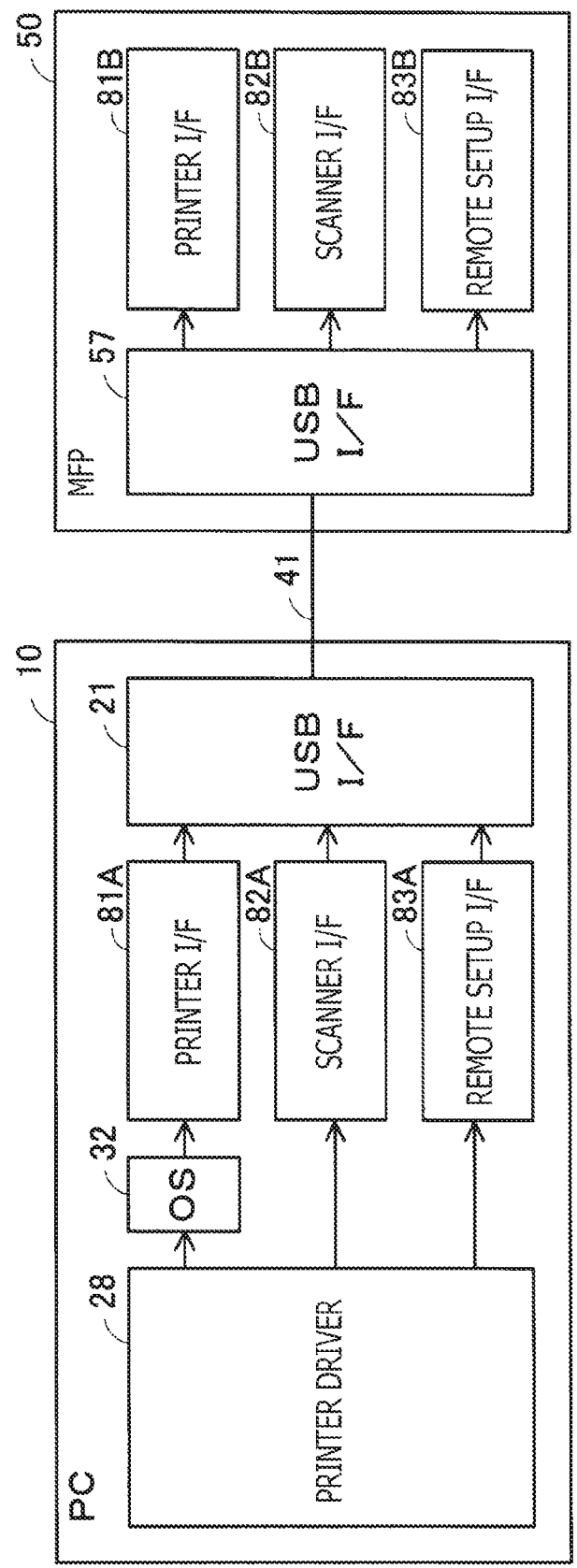
FIG. 5 is an illustration for explaining a communication interface for communicably connecting the PC and the MFP via a USB cable, in the first illustrative embodiment according to one or more aspects of the present disclosure.

Next, referring to FIG. 5, communication to be performed between the PC 10 and the MFP 50 via the USB cable 41 will be described. The MFP 50 is configured to be recognized as a multi-function apparatus by the PC 10. The MFP 50 has a plurality of functions such as a printing function, a scanning function, and a remote setup function. The PC 10 has, as logical interfaces, a printer I/F 81A, a scanner I/F 82A, and a remote setup I/F 83A to perform data communication when the MFP 50 is executing the printing function, the scanning function, and the remote setup function, respectively. The MFP 50 has, as logical interfaces, a printer I/F 81B, a scanner I/F 82B, and a remote setup I/F 83B to perform data communication when the MFP 50 is executing the printing function, the scanning function, and the remote setup function, respectively. The printer I/F 81A, the scanner I/F 82A, and the remote setup I/F 83A are logical interfaces to perform communication according to a USB protocol via the USB I/F 21. The printer I/F 81B, the scanner I/F 82B, and the remote setup I/F 83B are logical interfaces to perform communication according to the USB protocol via the USB I/F 57. It is noted that the remote setup function is a function to accept various settings for the MFP 50 not via the input I/F 55 of the MFP 50 but via (the I/F 18 of) the PC 10. In response to a request from the printer driver 28, the OS 32 performs data communication between the printer driver 28 and the printer I/F 81A. Meanwhile, data communication between the printer driver 28 and the scanner I/F 82A or the remote setup I/F 83A is performed by the printer driver 28. It is noted that the information management program 90 counts the number of printed sheets based on a print job transmitted via the printer I/F 81A or on a print job received via the printer I/F 81B. Meanwhile data communication via the scanner I/Fs 82A and 82B or the remote setup I/Fs 83A and 83B (without involving the printer I/F 81A or 81B) is out of data communication to be monitored by the information management program 90. Therefore, a preceding command communicated via the scanner I/Fs 82A and 82B or the remote setup I/Fs 83A and 83B (without involving the printer I/F 81A or 81B) is never erroneously recognized as a print job by the information management program 90.

It is noted that typically, the "print job" is a particular format of data for causing the MFP 50 to perform an intended printing process. The print job includes various types of data and instructions such as print data representing an image to be printed by the MFP 50 and an ink discharge instruction to cause the printer 63 to discharge ink.

The PC 10 transmits a preceding command to the MFP 50 prior to transmitting a print job to the MFP 50. The preceding command instructs the MFP 50 to perform preparation operations for performing a printing process. Specifically, the preparation operations may include an uncapping operation of removing the cap covering the nozzles of the printer 63 and exposing the nozzles. By transmitting the preceding command prior to transmitting the print job, it is possible to shorten a period of time from when the print job is transmitted until when a first sheet is printed. Subsequently, a preceding command transmitting process will be described.

Figure 8:
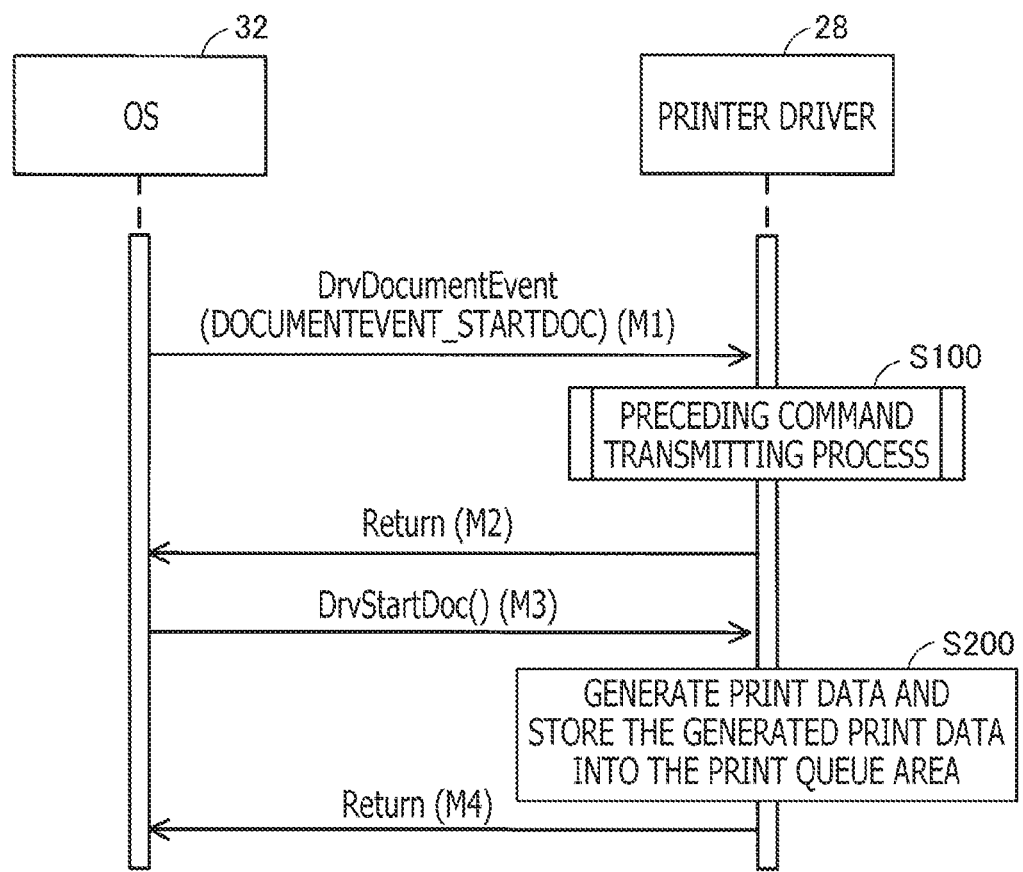
FIG. 8 is a sequence chart showing a sequence of processes regarding transmission of a preceding command and a print job, in the first illustrative embodiment according to one or more aspects of the present disclosure.

It is noted that the following processes and the following steps of flowcharts are basically executed by the CPU 12 in accordance with instructions described in programs such as the printer driver 28. Namely, in the following description, processes and operations such as "determining" represent processes by the CPU 12. Further, the printer driver 28 defines functions to be invoked by the OS 32. In response to a specific function being invoked by the OS 32, a corresponding step is executed by the CPU 12. Communication between each application program 26 and the printer driver 28 is performed via the OS 32. Here, processes by the CPU 12, including processing involving the OS 32, will be described. FIG. 8 is a sequence diagram showing processes to be performed between the OS 32 and the printer driver 28. In response to receiving a print instruction from the application program 26, the OS 32 invokes a function "DrvDocumentEvent" with "DOCUMENTEVENT_STARTDOC" as an argument (M1). In response to the message M1, the printer driver 28 performs a preceding command transmitting process (S100) and sends "Return" back to the OS 32 (M2). The preceding command transmitting process will be described later in detail. In response to the message M2, the OS 32 invokes a function "DrvStartDoc( )" (M3). In response to the message M3, the printer driver 28 generates print data and sends the generated print data to the OS 32 (S200). Specifically, the printer driver 28 rasterizes contents data received from the application program 26 via the OS 32, thereby generating the print data. Further, the printer driver 28 stores the generated print data into a print queue area of the data storage area 34. The print queue area is associated with a print port specified by print port information included in the setting information 29. Each piece of the print data stored in the print queue area is sequentially transmitted as a print job to the MFP 50 by the OS 32. The MFP 50 performs a printing process based on the print job received from the OS 32. Then, the printer driver 28 sends "Return" back to the OS 32 (M4).

Figure 6:
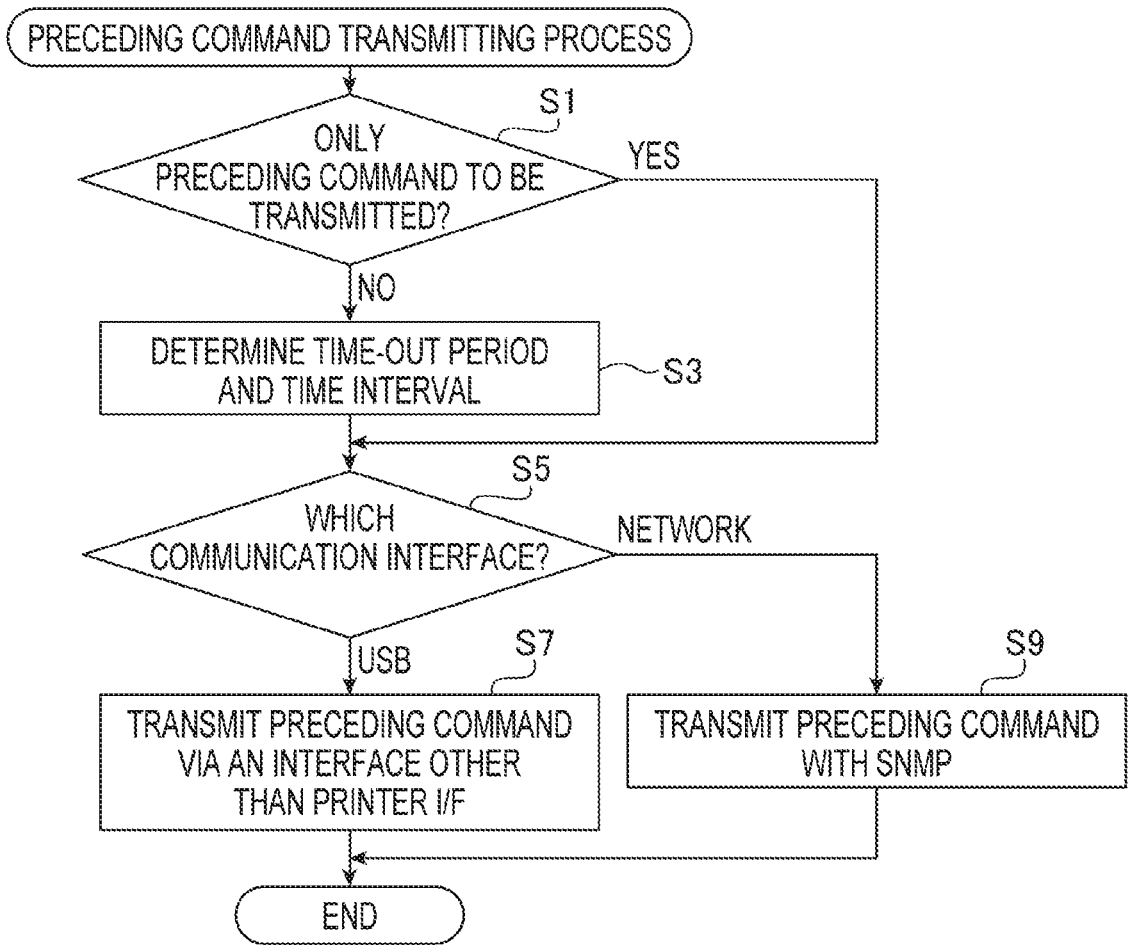
FIG. 6 is a flowchart showing a procedure of a preceding command transmitting process in the first illustrative embodiment according to one or more aspects of the present disclosure.

Subsequently, the preceding command transmitting process (S100) will be described with reference to FIG. 6. After starting the preceding command transmitting process, first, the printer driver 28 determines whether to transmit only the preceding command, with reference to the setting information 29 and the print instruction (S1). Specifically, the printer driver 28 determines whether to transmit only the preceding command without a time-out period or a time interval added thereto or transmit the preceding command with the time-out period and/or the time interval added thereto. When the preceding command is transmitted without the time-out period or the time interval added thereto, the MFP 50 performs the preparation operations in accordance with predetermined setting values.

It is noted that the time-out period is a period of time from when the MFP 50 makes a transition from the standby state into the print waiting state after completing the preparation operations until when the MFP 50 returns into the standby state. Specifically, when the time-out period has elapsed in a state where the MFP 50 is in the print waiting state without receiving a print job or performing a printing process after completing the preparation operations, the MFP 50 performs returning operations to return into the standby state. Specifically, for instance, the returning operations may include a capping operation of moving the cap of the printer 63 to the position to cover the nozzles. Thus, for instance, even though the MFP 50 has successfully received the preceding command but failed to receive a print job due to a communication failure, it is possible, by setting the time-out period, to prevent the MFP 50 from being maintained in the print waiting state for an unnecessarily long period of time. Further, the time interval is a period of time from when the MFP 50 receives the preceding command until when the MFP 50 starts the preparation operations. The MFP 50 begins to perform the preparation operations after the lapse of the time interval from the receipt of the preceding command.

The time-out period may be set depending on a type of the communication interface for connecting the PC 10 with the MFP 50. Here, suppose that the time-out period is previously set for the MFP 50 under an assumption that the PC 10 is connected with the MFP 50 via the wired LAN or the USB cable. For instance, a communication speed between the PC 10 and the MFP 50 connected via the wireless LAN is lower than a communication speed between the PC 10 and the MFP 50 connected via the wired LAN or the USB cable. Namely, the communication speed varies depending on a communication environment. Then, when the time-out period is set to be long, even though a long period of time is required until the MFP 50 receives a print job after receiving the preceding command, it is possible to prevent the returning operations from being performed by the MFP 50. In the first illustrative embodiment, when the PC 10 is connected with the MFP 50 via the wireless LAN, the preceding command is transmitted with the time-out period added thereto. It is noted that the information on the communication interface may be acquired by referring to the print port information included in the setting information 29.

Further, for instance, when it is previously assumed that a long period of time is required to generate a print job, it is possible, by setting the time interval, to prevent the MFP 50 from being maintained in the print waiting state for an unnecessarily long period of time. In the first illustrative embodiment, the time interval previously set on the MFP 50 may be zero. For instance, exemplary cases where a long period of time is required to generate a print job may include, but are not limited to, a case where a print instruction output from the application program 26 includes a setting for causing the MFP 50 to serially perform printing from a last one of pages included in the contents data sent by the application program 26. In the first illustrative embodiment, when it is previously assumed that a long period of time is required to generate a print job, the time interval is added to the preceding command.

When at least one of the time interval and the time-out period is set to be added to the preceding command, the printer driver 28 makes a negative determination in S1 (S1: No). Meanwhile, when none of the time interval and the time-out period is set to be added to the preceding command, the printer driver 28 makes an affirmative determination in S1 (S1: Yes).

In response to determining to transmit the preceding command with at least one of the time-out period and the time interval added thereto (S1: No), the printer driver 28 determines the time-out period and the time interval (S3). For instance, in S3, the printer driver 28 may accept respective setting values for the time-out period and the time interval input via a GUI by the user, and may determine the accepted setting values as the time-out period and the time interval. Meanwhile, in response to determining to transmit only the preceding command without the time-out period or the time interval added thereto (S1: Yes), the printer driver 28 goes to S5 without executing S3.

Subsequently, based on the setting information 29, the printer driver 28 determines whether the PC 10 and the MFP 50 are interconnected via the network 40 or via the USB cable 41 (S5). In response to determining that the PC 10 and the MFP 50 are interconnected via the USB cable 41 (S5: USB), the printer driver 28 transmits the preceding command via one of the interfaces (i.e., the scanner I/F 82A and the remote setup I/F 83A) other than the printer I/F 81A (S7). Thereby, the preceding command is never transmitted via the printer I/F 81A. Hence, it is possible to prevent the information management program 90 from erroneously recognizing the preceding command as a print job.

It is noted that when determining to transmit the preceding command with at least one of the time-out period and the time interval added thereto (S1: No), the printer driver 28 transmits, in S7, the preceding command with the time-out period and/or the time interval added thereto. Meanwhile, when determining to transmit only the preceding command without the time-out period or the time interval added thereto (S1: Yes), the printer driver 28 transmits only the preceding command in S7. The same applies to a below-mentioned step S9.

Specifically, in S7, the printer driver 28 transmits "EXECUTE PRNREADY" as the preceding command. Further, as needed, the printer driver 28 transmits, as a command representing the time interval, a command having a numerical value, expressed with a unit "ms," added following "SET PRNREADYDERAY=." Further, as needed, the printer driver 28 transmits, as a command representing the time-out period, a command having a numerical value, expressed with the unit "ms," added following "SET UNCAPTIMEOUT=." It is noted that "the preceding command with the time-out period and/or the time interval added thereto" represents that these commands are transmitted at the same timing. In response to receiving the preceding command transmitted in S7, the MFP 50 performs the preparation operations. Further, when the preceding command includes the time-out period and the time interval added thereto, the MFP 50 performs the preparation operations in accordance with information defined by the time-out period and the time interval.

Meanwhile, in response to determining that the PC 10 and the MFP 50 are interconnected via the network 40 (S5: Network), the printer driver 28 transmits the preceding command via the SNMP I/F 74A (S9). Thereby, the preceding command is never transmitted via the Port 9100 I/F 71A, the LPR I/F 72A, or the IPP I/F 73A. Hence, it is possible to prevent the information management server 70 or the information management program 90 from erroneously recognizing the preceding command as a print job.

To transmit the preceding command via the SNMP I/F 74A, for instance, the printer driver 28 specifies an object ID (hereinafter referred to as an "OID") that is previously determined as an OID of the MIB 61 to store information as to whether to perform the preparation operations, and transmits an instruction to write the information into the specified OID. With respect to the time-out period and the time interval as well, the printer driver 28 specifies an OID that is previously determined as an OID to store information regarding each of the time-out period and the time interval, and transmits an instruction to write the information into the specified OID. Hereinafter, the OID to store the information as to whether to perform the preparation operations may be referred to as a "preparation-operation OID." Further, the OID to store the information regarding the time-out period may be referred to as a "time-out OID." Further, the OID to store the information regarding the time interval may be referred to as an "interval OID." For instance, when the information in the preparation-operation OID is "1," the information may represent that the preparation operations are set to be performed. Meanwhile, when the information in the preparation-operation OID is "0," the information may represent that the preparation operations are set not to be performed. As exemplified above, it is previously defined what is represented by the information stored in each OID. Thus, in this case, in S9, the printer driver 28 transmits an instruction to write "1" into the preparation-operation OID. Further, as needed, the printer driver 28 transmits an instruction to write the setting value of the time-out period determined in S3 into the time-out OID and an instruction to write the setting value of the time interval determined in S3 into the interval OID. It is noted that the aforementioned instructions to write the respective setting values into the preparation-operation OID, the time-out OID, and the interval OID may be transmitted at the same timing, or may be transmitted as a single instruction. In the case where the printer driver 28 is configured to transmit the aforementioned instructions as a single instruction, for instance, when both the respective setting values for the time-out period and the time interval are "500," the printer driver 28 may specify the preparation-operation OID, the time-out OID, and the interval OID, and may transmit a single instruction to write consecutive values "1, 500, 500" into the respective specified OIDs.

In response to receiving the preceding command transmitted in S9, the MFP 50 writes the setting value represented by the received preceding command into the preparation operation OID. Further, when the received preceding command includes the time-out period and the time interval added thereto, the MFP 50 writes the respective setting values for the time-out period and the time interval into the time-out OID and the interval OID in accordance with the preceding command. When the received preceding command includes the information representing that the preparation operations are set to be performed, the MFP 50 performs the preparation operations in accordance with the respective setting values written in the time-out OID and the interval OID.

After completion of S7 or S9, the printer driver 28 terminates the preceding command transmitting process.

As described above, the first illustrative embodiment may provide the following advantageous effects. When transmitting the preceding command via the USB cable 41, the printer driver 28 transmits the preceding command via the scanner I/F 82A or the remote setup I/F 83A (S7). Further, when transmitting the preceding command via the network 40, the printer driver 28 transmits the preceding command via the SNMP I/F 74A (S9). Thus, the preceding command is transmitted via an interface different from an interface for transmitting the print job. Hence, it is possible to prevent the information management server 70 or the information management program 90 from mistakenly counting the number of printed sheets.

Further, the printer driver 28 may determine the time interval and the time-out period (S3) and transmit the preceding command with the time interval and/or the time-out period added thereto (S7 or S9). Thereby, it is possible to cause the MFP 50 to perform the preparation operations in accordance with the time interval and/or the time-out period. By setting the time interval, it is possible to prevent the MFP 50 from being held in the print waiting state for an unnecessarily long period of time. By setting the time-out period, it is possible to prevent the MFP 50 from returning into the standby state from the print waiting state prior to the lapse of the time-out period.

Further, in S9, the printer driver 28 transmits the preceding command by using the SNMP protocol. Thereby, it is possible to cause the MFP 50 to perform the preparation operations based on the preceding command according to the SNMP protocol.

Further, in S7, the printer driver 28 transmits the preceding command via an interface other than the printer I/F 81A. Thereby, it is possible to cause the MFP 50 to perform the preparation operations based on the preceding command transmitted via an interface other than the printer I/F 81A.

Further, the MFP 50 performs the preparation operations in response to receiving the preceding command, and performs printing in response to receiving the print job. Thus, the MFP 50 may perform operations according to the preceding command and the print job. The preceding command is transmitted via an interface different from an interface for transmitting the print job. Hence, it is possible to prevent the information management server 70 or the information management program 90 from erroneously counting the number of printed sheets.

Second Illustrative Embodiment

Figure 7:
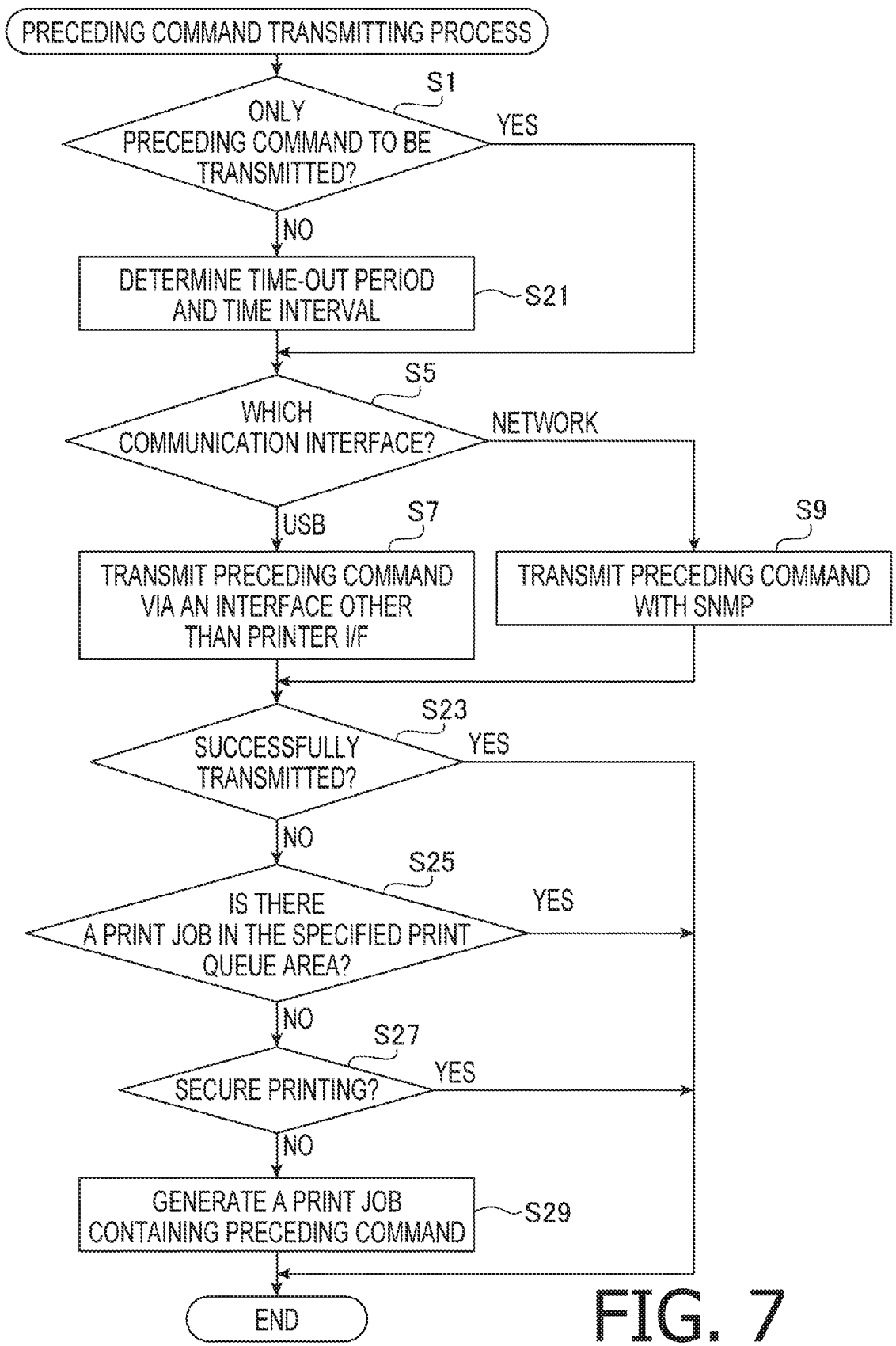
FIG. 7 is a flowchart showing a procedure of a preceding command transmitting process in a second illustrative embodiment according to one or more aspects of the present disclosure.

Subsequently, referring to FIG. 7, an explanation will be provided of a preceding command transmitting process in a second illustrative embodiment according to aspects of the present disclosure. It is noted that the same steps as those of the preceding command transmitting process (see FIG. 6) in the first illustrative embodiment will be provided with the same reference characters, and detailed explanations thereof will be omitted.

After starting the preceding command transmitting process, the printer driver 28 executes the same step S1 as exemplified in the first illustrative embodiment. In response to determining to transmit the preceding command with at least one of the time-out period and the time interval added thereto (S1: No), the printer driver 28 (more specifically, the CPU 12 executing the printer driver 28) refers to the setting information 29 and the print instruction, and determines the time-out period and the time interval based on a table on which respective setting values for the time-out period and the time interval are previously registered in association with various conditions (e.g., the communication interface between the PC 10 and the MFP 50) (S21). Specifically, the table includes a setting value of the time-out period for wired LAN connection or USB connection, and a setting value of the time-out period for wireless LAN connection. The printer driver 28 determines the communication interface between the PC 10 and the MFP 50, based on the setting information 29. Then, the printer driver 28 determines the time-out period depending on the determined communication interface. Further, the printer driver 28 sets the time interval based on print setting information included in the print instruction. Specifically, the table includes a setting value for the time interval associated with the print setting information, and the setting value is set as the time interval. The table is previously stored in the memory 14.

After completion of S21 or in response to determining to transmit only the preceding command without the time-out period or the time interval added thereto (S1: Yes), the printer driver 28 performs the steps S5 to S9, and determines whether the preceding command has been successfully transmitted (S23). After receiving the preceding command, in response to successfully writing the information as to whether to perform the preparation operations into the specified OID, the printer program 59 of the MFP 50 sends a message representing that the information has been successfully written, back to the PC 10. Meanwhile, in response to failing to write the information, the printer program 59 sends a message representing the failure to write the information, back to the PC 10. In response to determining that the preceding command has been successfully transmitted (S23: Yes), the printer driver 28 terminates the preceding command transmitting process. Meanwhile, in response to determining that the preceding command has not been successfully transmitted (S23: No), the printer driver 28 determines whether there is a print job in the print queue area associated with the MFP 50 (S25).

When the printer driver 28 generates print data in response to having received another print instruction before the preceding command transmitting process currently in execution, and a print job including the generated print data is not yet transmitted to the MFP 50, the print job remains in the print queue area. When there is a print job in the print queue area associated with the MFP 50 (S25: Yes), the MFP 50 is waiting for the print job to be transmitted by the PC 10, and therefore, there is no need for the printer driver 28 to transmit a preceding command Hence, in this case, the printer driver 28 terminates the preceding command transmitting process.

Meanwhile, in response to determining that there is not a print job in the print queue area associated with the MFP 50 (S25: No), the printer driver 28 determines whether a secure printing function is set valid, for instance, based on the print setting information included in the print instruction (S27). It is noted that the secure printing function is a function to perform printing in response to previously-set authentication information such as a PIN (which is an abbreviation of "Personal Identification Number") being input via the input I/F 55 of the MFP 50. Information as to whether the secure printing function is set valid may be included in the print setting information. When the secure printing function is set valid, even if receiving the print job, the MFP 50 does not perform the printing process until receiving the authentication information. Thus, in this case, since a period of time required until the printing process is started is unknown, in response to determining that the secure printing function is set valid (S27: Yes), the printer driver 28 terminates the preceding command transmitting process.

Meanwhile, when the secure printing function is not set valid (S27: No), the MFP 50 is highly likely to be in the standby state. Therefore, in this case, the printer driver 28 generates a print job containing the preceding command (S29). Specifically, the printer driver 28 generates a print job containing the preceding command, and stores the generated print job into the print queue area of the data storage area 34. The print queue area is associated with the print port defined by the print port information included in the setting information 29. Each piece of the print data stored in the print queue area is sequentially transmitted as a print job to the MFP 50 by the OS 32. In response to determining that the preceding command is contained in the received print job, the MFP 50 performs the preparation operations. When the PC 10 and the MFP 50 are interconnected via the network 40, the OS 32 transmits the print job via one of the Port 9100 I/F 71A, the LPR I/F 72A, and the IPP I/F 73A. When the PC 10 and the MFP 50 are interconnected via the USB cable 41, the OS 32 transmits the print job via the printer I/F 81A. Thereby, even when the printer driver 28 has failed to transmit the preceding command in S7 or S9, it is possible to cause the MFP 50 to perform the preparation operations. In the second illustrative embodiment, the preceding command transmitting process may be performed when the printing system 1 does not include the information management server 70 or the information management program 90.

In S21, the printer driver 28 determines the time interval based on the print setting information included in the print instruction, and determines the time-out period based on the communication interface between the PC 10 and the MFP 50. Thus, the printer driver 28 may determine the time interval and the time-out period based on the print setting information included in the print instruction and on the communication interface between the PC 10 and the MFP 50, respectively.

Further, when determining that the preceding command has not been successfully transmitted (S23: No), the printer driver 28 transmits the print job containing the preceding command, to the MFP 50 in S29. Thereby, even though the printer driver 28 has failed to transmit the preceding command in S7 or S9, it is possible to cause the MFP 50 to perform the preparation operations.

Third Illustrative Embodiment

Subsequently, a third illustrative embodiment according to aspects of the present disclosure will be described with reference to FIGS. 9-16. It is noted that the same elements as exemplified in the aforementioned illustrative embodiments will be provided with the same reference characters, and detailed explanations thereof will be omitted.

Figure 1:
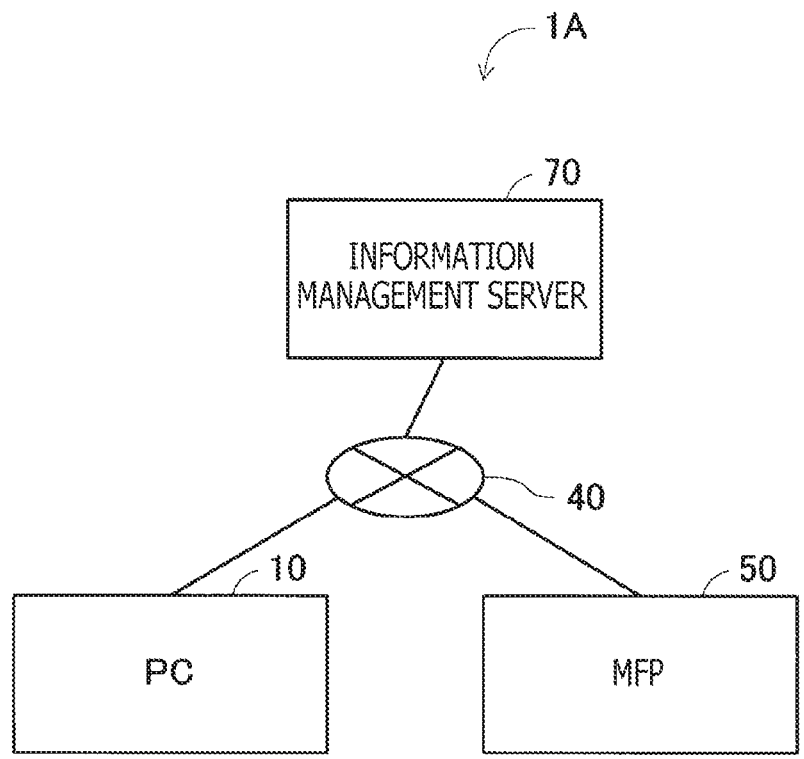
Figure 2:
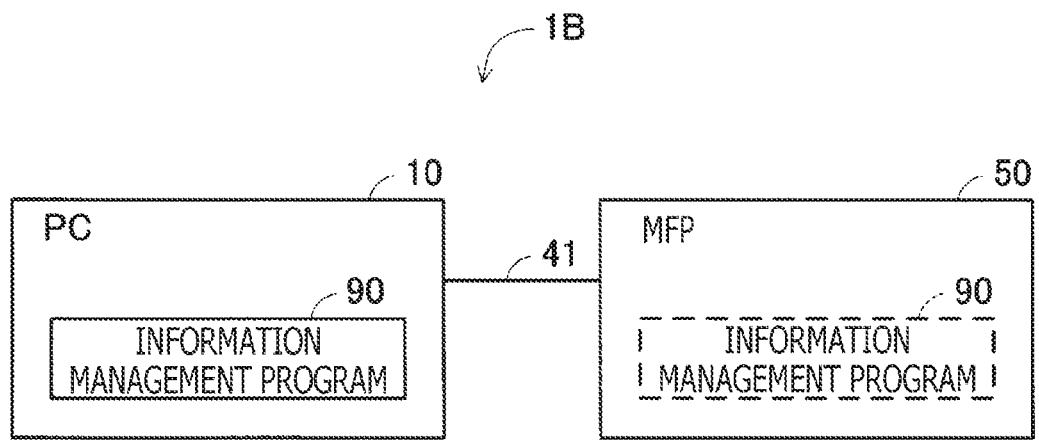

In the third illustrative embodiment, the printing system 1 may have substantially the same configuration as shown in FIG. 1. Nonetheless, the configuration of the printing system 1 is not limited to the example shown in FIG. 1. For instance, the printing system 1 may not include the information management server 70. In this case, the print job may be communicated directly between the PC 10 and the MFP 50 via the network 40. Further, in this case, the printing system 1 may have the information management program 90 configured to, when executed by the PC 10 or the MFP 50, monitor the print job. Further, a plurality of the PCs 10 may be connected with the network 40.

Figure 9:
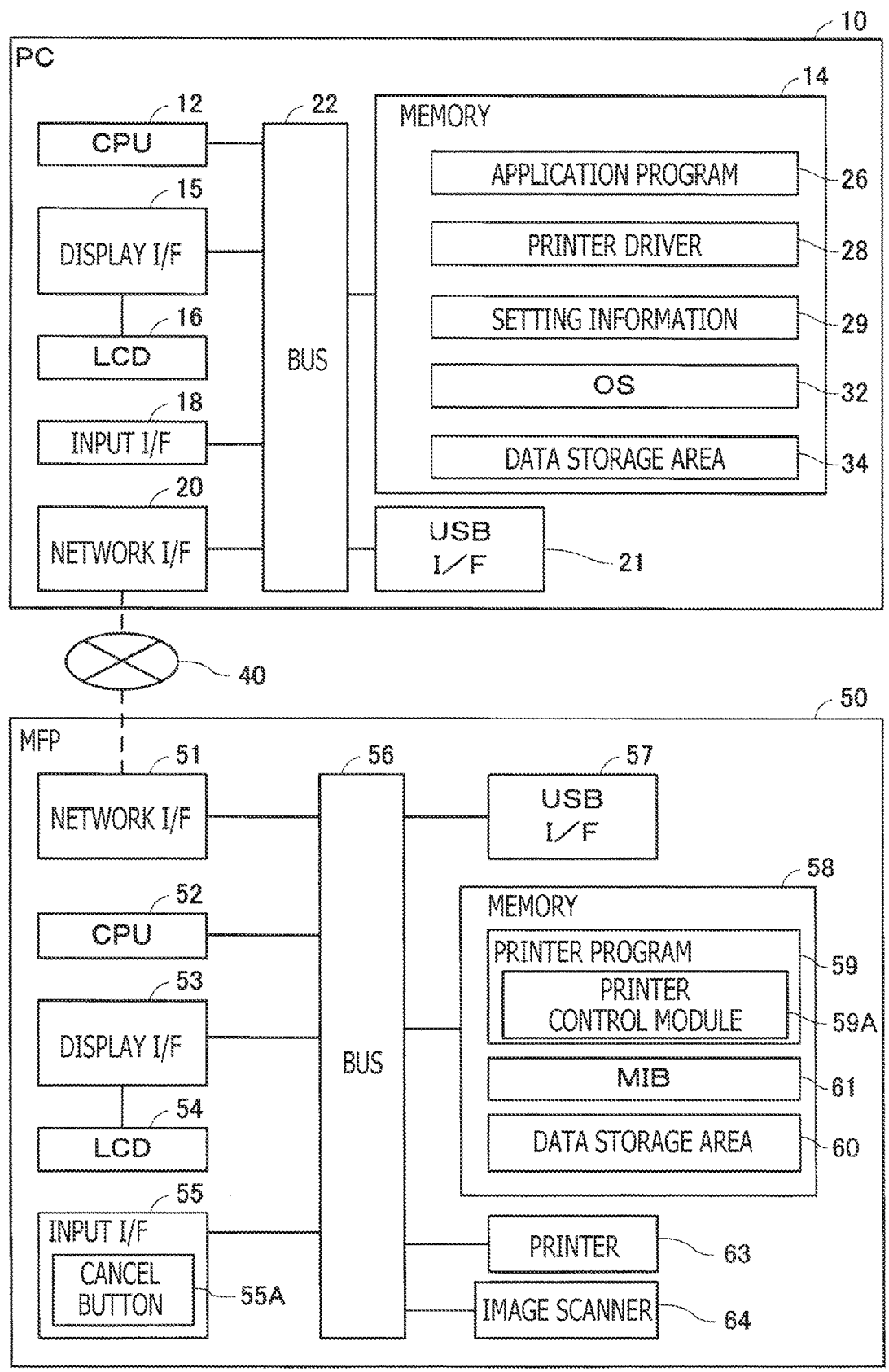
FIG. 9 is a block diagram schematically showing configurations of a PC and an MFP included in a printing system in a third illustrative embodiment according to one or more aspects of the present disclosure.

Subsequently, configurations of the PC 10 and the MFP 50 will be described with reference to FIG. 9. As understood from comparison between FIGS. 3 and 9, the PC 10 of the third illustrative embodiment has substantially the same configuration as exemplified in the aforementioned first illustrative embodiment. Hence, a detailed explanation of the configuration of the PC 10 will be omitted. Meanwhile, the MFP 50 of the third illustrative embodiment has a configuration slightly different from that exemplified in the first illustrative embodiment, with respect to the following points.

In the third illustrative embodiment, the printer program 59 stored in the memory 58 includes a plurality of modules, one of which is a printer control module 59A. The printer control module 59A has a function to control the printer 63, primarily in accordance with the print job.

In the aforementioned first illustrative embodiment, the MIB 61 is stored in the data storage area 60. However, in the third illustrative embodiment, the MIB 61 is stored separately from the data storage area 60 in the memory 58.

Further, in the third illustrative embodiment, the input I/F 55 includes one or more buttons such as a cancel button 55A.

Figure 4:
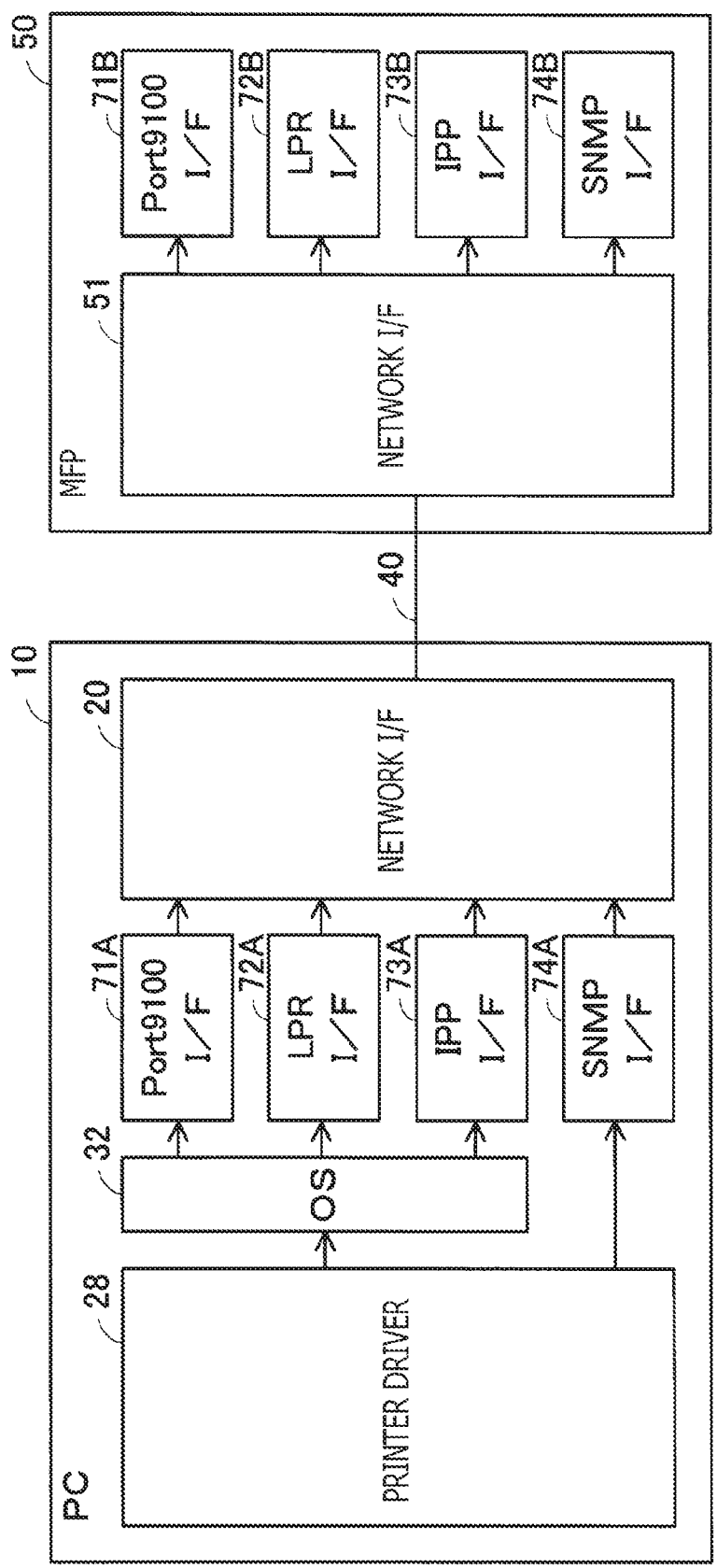
FIG. 4 is an illustration for explaining a communication interface for communicably connecting the PC and the MFP via a network, in the first illustrative embodiment according to one or more aspects of the present disclosure.

Further, in the third illustrative embodiment, the network I/F 20 of the PC 10 and the network I/F 51 of the MFP 50 may be communicably interconnected via the network 40 in the same manner as exemplified in the aforementioned first illustrative embodiment with reference to FIG. 4.

Figure 10:
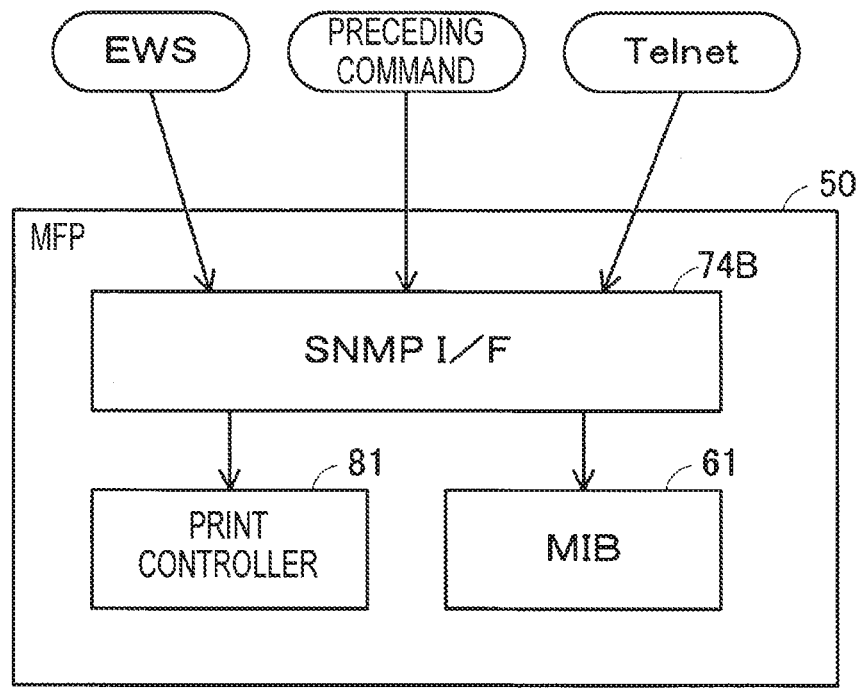
FIG. 10 is a functional block diagram in communication using an SNMP protocol, in the third illustrative embodiment according to one or more aspects of the present disclosure.

FIG. 10 is a functional block diagram for the MFP 50. For instance, depending on information received via the SNMP I/F 74B, the CPU 52 may perform various kinds of processing such as transmitting an instruction to a print controller 81, writing information into the MIB 61, and reading out information written in the MIB 61. The print controller 81 is configured to control operations of the printer 63. For instance, examples of the information received via the SNMP I/F 74B may include, but are not limited to, information for the EWS, the preceding command, and information regarding Telnet. These types of information may be sequentially processed by the CPU 52 in the same order as received. Hence, while the CPU 52 is processing particular information other than the preceding command, the CPU 52 does not begin to process the preceding command until the CPU 52 completes processing the particular information. It is noted that the CPU 52 may perform the aforementioned processes by executing the printer program 59. Further, the print controller 81 may be realized by the CPU 52 executing the printer control module 59A.

As described above, the PC 10 transmits the preceding command to the MFP 50 prior to transmitting the print job to the MFP 50. The preceding command instructs the MFP 50 to perform the preparation operations (e.g., the uncapping operation of removing the cap covering the nozzles of the printer 63 and exposing the nozzles) for image formation. By transmitting the preceding command prior to transmitting the print job, it is possible to shorten the period of time from when the print job is transmitted until when the first sheet is printed. However, when the preceding command is transmitted to one of the interfaces (e.g., the Port 9100 I/F 71B, the LPR I/F 72B, and the IPP I/F 73B) for receiving the print job, the information management server 70 might erroneously recognize the preceding command as a print job and might mistakenly count the number of printed sheets. Thus, in the third illustrative embodiment, in the same manner as exemplified in the aforementioned first illustrative embodiment, the printing system 1 is configured to transmit the preceding command from the PC 10 to the MFP 50 via the SNMP I/F 74A that is an interface different from the interfaces (e.g., the Port 9100 I/F 71A, the LPR I/F 72A, and the IPP I/F 73A) for transmitting the print job. The information management server 70 receives print jobs transmitted via the Port 9100 I/F 71A, the LPR I/F 72A, and the IPP I/F 73A, and counts the number of printed sheets based on the received print jobs. Meanwhile, data communication via the SNMP I/Fs 74A and 74B is performed directly between the PC 10 and the MFP 50 without involving the information management server 70. Hence, the preceding command communicated via the SNMP I/Fs 74A and 74B is never erroneously recognized as a print job by the information management server 70. Thereby, the information management server 70 may accurately count the number of printed sheets.

Meanwhile, the MFP 50 receives the preceding command and the print job via the respective different interfaces. Therefore, the MFP 50 may not necessarily receive the preceding command and the print job at the same timing. Subsequently, explanations will be provided of processes that enable appropriate operations of the printing system 1 configured to communicate the preceding command and the print job via the respective different interfaces.

As described above, communication between each application program 26 and the printer driver 28 is performed via the OS 32. However, in the following description, an explanation regarding the OS 32 may be omitted for the sake of simple explanation.

Figure 11:
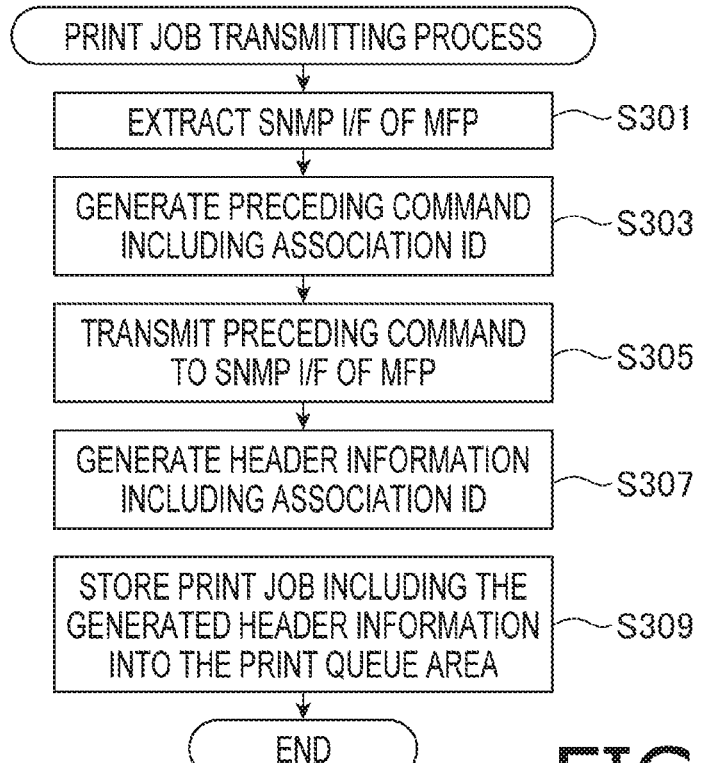
FIG. 11 is a flowchart showing a procedure of a print job transmitting process in the third illustrative embodiment according to one or more aspects of the present disclosure.

First, an explanation will be provided of a print job transmitting process to be performed by the printer driver 28 (more specifically, by the CPU 12 executing the printer driver 28), with reference to FIG. 11. In response to receiving a print instruction from a corresponding one of the application program 26, the printer driver 28 starts the print job transmitting process. After starting the print job transmitting process, first, the printer driver 28 extracts the SNMP I/F 74B of the MFP 50 specified as a transmission destination of the print job by the print instruction, with reference to the setting information 29, in order to transmit the preceding command (S301). Subsequently, the printer driver 28 generates a preceding command including an association ID (S303). It is noted that the association ID is an identifier for associating the preceding command with the print job. For instance, the association ID may be a name of a user who is logging in to the PC 10.

Specifically, for instance, "BR_PRECOMMAND," which is a command in the SNMP protocol, is previously determined to be treated as the preceding command between the printer driver 28 and the MFP 50. To the command, the association ID and an object ID for a destination into which the association ID is to be written are added. As shown in FIG. 12, when the association ID is added to the preceding command, the preceding command further includes Length information added into 2 bytes in front of the association ID and a value of NULL added into 1 byte at the back of the association ID.

Subsequently, the printer driver 28 transmits the preceding command generated in S303 to the SNMP I/F 74B of the MFP 50 extracted in S301 (S305). Next, the printer driver 28 generates header information for the print job including the association ID (S307). The print job includes a plurality of pieces of information, one of which is the header information. In S307, the header information is generated to include the association information. Specifically, as shown in FIG. 13, the header information is generated to include the association information and further include a command for the association ID in front of the association ID and a value of NULL at the back of the association ID. Thus, the same association ID is added to both the preceding command and the print job.

Subsequently, the printer driver 28 generates the print job including the header information generated in S307 with the association ID included therein, and stores the generated print job into the print queue area associated with the print port specified by the print port information included in the setting information 29 stored in the data storage area 34 (S309). Each print job stored in the print queue area is sequentially transmitted to the MFP 50 by the OS 32. After completion of S9, the printer driver 28 terminates the print job transmitting process.

Subsequently, an explanation will be provided of a preceding command receiving process to be performed by the printer program 59 (more specifically, by the CPU 52 executing the printer program 59), with reference to FIGS. 14A and 14B. In response to receiving a preceding command via the SNMP I/F 74B, the printer program 59 starts the preceding command receiving process. After starting the preceding command receiving process, first, the printer program 59 determines whether a print job, including the same association ID as included in the received preceding command, has been completed (S311). It is noted that in the below-mentioned step S325, an association ID included in a completed print job is stored into the MIB 61. When the same association ID as included in the preceding command is stored in the MIB 61, the printer program 59 determines that the print job has been completed (S311: Yes). Meanwhile, when the same association ID as included in the preceding command is not stored in the MIB 61, the printer program 59 determines that the print job has not been completed (S311: No). It is noted that the case where a negative determination is made in S311 (S311: No) is a case where an uncompleted print job will be received following the preceding command. Further, the case where an affirmative determination is made in S311 (S311: Yes) is a case where the preceding command for a completed print job has been received. In response to determining that the print job has not been completed (S311: No), the printer program 59 writes the association ID included in the received preceding command into an OID of the MIB 61 specified by the preceding command, thereby holding the association ID of the preceding command (S313).

Next, the printer program 59 determines whether printing is in progress (S314). If printing is in progress (S314: Yes), it means that a corresponding print job has been processed in a preceding command receiving process performed in response to receipt of the preceding command prior to the start of the currently-executed preceding command. Hence, in this case (S314: Yes), the printer program 59 terminates the preceding command receiving process. Meanwhile, in response to determining that printing is not in progress (S314: No), the printer program 59 transmits an instruction to perform the preparation operations to the print controller 81 (S315). Thereby, the preparation operations are performed.

Subsequently, in response to receiving a print job via one of the Port 9100 I/F 71B, the LPR I/F 72B, and the IPP I/F 73B, the printer program 59 stores the received print job into the data storage area 60, and transmits an instruction to execute the print job to the print controller 81 (S317). Thereby, printing according to the print job is performed. Then, the printer program 59 determines whether the printing has been completed (S319). In response to printing according to a single print job being completed, the print controller 81 may transmit to the printer program 59 a message representing that the printing has been completed. In this case, in response to receiving from the print controller 81 the message representing that the printing has been completed, the printer program 59 may determine that the printing has been completed. In response to determining that the printing has not been completed (S319: No), the print program 59 repeatedly makes the determination in S319 until determining that the printing has been completed. In response to determining that the printing has been completed (S319: Yes), the print program 59 determines whether the same association ID of the preceding command as included in the completed print job is stored in the MIB 61 (S321). In response to determining that the same association ID of the preceding command as included in the completed print job is stored in the MIB 61 (S321: Yes), the printer program 59 discards the association ID stored in the MIB 61 (S323). Meanwhile, in response to determining that the same association ID of the preceding command as included in the completed print job is not stored in the MIB 61 (S321: No), the printer program 59 stores the association ID included in the completed print job into a particular OID of the MIB 61 as an association ID for completed printing (S325).

After completion of S23 or S25, the printer program 59 determines whether printing according to every print job has been completed (S327). In a state where a plurality of print jobs are stored in the print queue area of the PC 10, at a timing when transmission of a single print job is completed, a next print job is transmitted. Hence, when receiving no new print job, the printer program 59 determines that printing according to every print job has been completed (S327: Yes). Meanwhile, when receiving a new print job, the printer program 59 determines that printing according to every print job has not been completed (S327: No). In this case (S327: No), the printer program 59 goes back to S317. In S317, printing is performed in accordance with a print job that includes an association ID different from the association ID of the preceding command received at the beginning of the preceding command receiving process. It is noted that the association ID of the print job referred to in S325 is different from the association ID of the preceding command referred to in S311. Meanwhile, in response to determining that printing according to every print job has been completed (S327: Yes), the printer program 59 terminates the preceding command receiving process.

If the print job, including the same association ID as included in the received preceding command, has been completed (S311: Yes), the received preceding command is unnecessary. Therefore, in this case (S311: Yes), the printer program 59 discards the received preceding command and the association ID of the completed print job (S329). Afterward, the printer program 59 terminates the preceding command receiving process.

In response to a lapse of a particular period of time since the printer program 59 stored the association ID included in the preceding command into the MIB 61 (S313), the printer program 59 deletes the stored association ID of the preceding command from the MIB 61. Further, in response to a lapse of the particular period of time since the printer program 59 stored the association ID included in the print job into the MIB 61 (S325), the printer program 59 deletes the stored association ID of the print job from the MIB 61. Although having received information such as a preceding command or a print job, the printer program 59 may fail to receive a preceding command or a print job including the same association ID as included in the received information, for instance, due to communication failure. Even in this case, since by deleting the association ID stored in the MIB 61 in response to a lapse of the particular period of time, it is possible to prevent an unfavorable state where an unnecessary association ID remains stored in the MIB 61.

FIG. 15 is a timing chart exemplifying a relationship among timings at which the MFP 50 receives each preceding command and each print job, starts and ends each printing process, and stores each association ID into the MIB 61. In response to receiving a preceding command including an association ID "User A," the MFP 50 performs the preparation operations. Subsequently, in response to receiving a print job including the association ID "User A," the MFP 50 performs a printing process according to the print job including the association ID "User A." Next, in response to receiving a print job including the association ID "User B" after completing the printing process according to the print job including the association ID "User A," the MFP 50 performs a printing process according to the print job including the association ID "User B." Likewise, in response to receiving a print job including the association ID "User C" after completing the printing process according to the print job including the association ID "User B," the MFP 50 performs a printing process according to the print job including the association ID "User C."

The association ID "User A" is stored into the MIB 61 at a timing when the preceding command including the association ID "User A" is received, and is discarded in response to completion of the printing process according to the print job including the association ID "User A." Likewise, the association ID "User B" is stored into the MIB 61 at a timing when the preceding command including the association ID "User B" is received, and is discarded in response to completion of the printing process according to the print job including the association ID "User B." Further, likewise, the association ID "User C" is stored into the MIB 61 at a timing when the preceding command including the association ID "User C" is received, and is discarded in response to completion of the printing process according to the print job including the association ID "User C." Thus, the MFP 50 may acquire, from an earlier-received preceding command, the same association ID as included in a print job to be received, prior to receiving the print job. Subsequently, an explanation will be provided of a print cancellation process in which the MFP 50 is allowed to accept an input to cancel a printing process according to a print job to be received.

In response to determining that the cancel button 55A has been pressed while printing is in progress responsive to the printer program 59 executing S317 in the preceding command receiving process, the printer program 59 starts the print cancellation process as shown in FIGS. 16A and 16B. It is noted that the same steps as those of the preceding command receiving process will be provided with the same reference characters, and detailed explanations of the same steps may be omitted.

First, the printer program 59 determines whether a plurality of the same association IDs as included in the preceding command are stored in the MIB 61 (S331). In response to determining that a plurality of the same association IDs as included in the preceding command are not stored in the MIB 61 (S331: No), the printer program 59 stops the printing in response to the cancel button 55A having been pressed, and deletes a print job corresponding to the stopped printing and the same association ID as included in the cancelled print job from the data storage area 60 and the MIB 61, respectively (S337). Afterward, the printer program 59 terminates the print cancellation process.

Meanwhile, in response to determining that a plurality of the same association IDs as included in the preceding command are stored in the MIB 61 (S331: Yes), the printer program 59 causes the LCD 54 to display a list of association IDs including the association ID of the print job corresponding to the printing currently in progress and association IDs stored in the MIB 61, thereby prompting the user to select one or more association IDs of print jobs to be cancelled from the displayed list, and then stores a list of the selected one or more association IDs into the data storage area 60 (S333). Subsequently, the printer program 59 determines whether the association ID of the print job corresponding to the printing currently in progress is included in the one or more association IDs, selected in S333, of the print jobs to be cancelled (S335). In response to determining that the association ID of the print job corresponding to the printing currently in progress is included in the selected one or more association IDs of the print jobs to be cancelled (S335: Yes), the printer program 59 stops the printing, and deletes the print job corresponding to the stopped printing and the same association ID as included in the cancelled print job from the data storage area 60 and the MIB 61, respectively (S339). Afterward, the printer program 59 goes to S341.

Meanwhile, in response to determining that the association ID of the print job corresponding to the printing currently in progress is not included in the selected one or more association IDs of the print jobs to be cancelled (S335: No), the printer program 59 performs the steps S319 to S325. Thereafter, the printer program 59 receives a next print job and stored the received print job into the data storage area 60 (S341). Subsequently, referring to the list, stored in the data storage area 60, of the selected one or more association IDs of the print jobs to be cancelled, the printer program 59 determines whether the received print job is included in the print jobs to be cancelled (S343). In response to determining that the received print job is included in the print jobs to be cancelled (S343: Yes), the printer program 59 deletes the print job from the data storage area 60, and deletes the same association ID as included in the cancelled print job from the MIB 61 (S347). Further, the printer program 59 deletes the same association ID as the association ID of the deleted print job from the list, stored in the data storage area 60, of the association IDs of the print jobs to be cancelled. Next, the print program 59 determines whether all the print jobs to be cancelled have been deleted, with reference to the list of the association IDs of the print jobs to be cancelled (S349). When there are one or more association IDs still remaining on the list of the association IDs of the print jobs to be cancelled, the print program 59 determines that all the print jobs to be cancelled have not been deleted (S349: No). Meanwhile, when there is no association ID on the list of the association IDs of the print jobs to be cancelled, the print program 59 determines that all the print jobs to be cancelled have been deleted (S349: Yes). In response to determining that all the print jobs to be cancelled have been deleted (S349: Yes), the printer program 59 terminates the print cancellation process. Meanwhile, in response to determining that all the print jobs to be cancelled have not been deleted (S349: No), the printer program 59 goes back to S341.

Meanwhile, in response to determining that the received print job is not included in the print jobs to be cancelled (S343: No), the printer program 59 transmits an instruction to execute the print job to the print controller 81 (S345). Afterward, the printer program 59 goes back to S319. It is noted that after terminating the print cancellation process, the printer program 59 resumes the preceding command receiving process, which is temporarily interrupted, from S17.

The third illustrative embodiment, as described above, provides the following advantageous effects. In response to receiving a print instruction from the application program 26 via the OS 32, the printer driver 28 transmits a preceding command including an association ID to the MFP 50 (S305), and generates a print job including the same association ID (S307). Further, in response to receiving the preceding command, the printer program 59 stores the association ID included in the received preceding command into the MIB 61 (S313). Further, after completion of printing, the printer program 59 deletes, from the MIB 61, the same association ID as included in the completed print job (S323). Thereby, even when the preceding command and the print job are received via the respective different interfaces, it is possible to appropriately process the preceding command and the print job in association with each other.

Further, when the same association ID as included in the completed print job is not stored in the MIB 61, the printer program 59 stores the association ID included in the completed print job into the MIB 61 as an association ID for completed printing (S325). Further, when receiving a preceding command, in response to determining that the same association ID as included in the received preceding command is stored as an association ID for completed printing (S311: Yes), the printer program 59 discards the preceding command (S329). Thereby, even when receiving a preceding command corresponding to a completed print job, the MFP 50 may discard the unnecessary preceding command.

Further, when receiving a print job including the same association ID as one of the association IDs, selected in S333, of the print jobs to be cancelled, the printer program 59 discards the received print job without performing printing according to the print job (S347). Thereby, even when the MFP 50 has not received a print job, the user may beforehand cancel a printing process according to the unreceived print job on the MFP 50.

Further, when receiving a preceding command by using the SNMP protocol, the printer program 59 writes an association ID included in the received preceding command into a specified OID of the MIB 61 (S313), and transmits an instruction to perform the preparation operations to the print controller 81 (S315). Thus, the MFP 50 may receive a preceding command via an interface different from interfaces for receiving a print job, by using the SNMP protocol, and may treat the preceding command as information including an association ID to be written into the MIB 61. Further, the PC 10 may instruct the MFP 50 to perform the preparation operations by transmitting the preceding command to the MFP 50.

Further, in response to a lapse of the particular period of time since the printer program 59 stored the association ID included in the preceding command or the association ID included in the print job into the MIB 61, the printer program 59 deletes, from the MIB 61, the association ID included in the preceding command or the association ID included in the print job. Thereby, when the predetermined period of time has elapsed in a state where the MFP 50 has successfully received only one of the preceding command and the print job, for instance, due to communication failure, the MFP 50 may delete the received one of the preceding command and the print job.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, the following modifications according to aspects of the present disclosure are feasible.

In the aforementioned first illustrative embodiment, in S3, the printer driver 28 accepts a setting value for the time interval input by the user, and determines the accepted setting value as the time interval. Nonetheless, for instance, the printer driver 28 may measure each individual time required from acceptance of a print instruction until transmission of a print job, during a particular period of time, and may record a history of the times measured during the particular period of time. In this case, the printer driver 28 may predict and determine the time interval from the recorded history.

Further, in the aforementioned first illustrative embodiment, in S3, the time-out period is determined depending on the communication interface between the PC 10 and the MFP 50. Nonetheless, for instance, the time-out period may be determined based on a communication speed measured between the PC 10 and the MFP 50. In this case, for instance, the printer driver 28 may transmit a message to the MFP 50 and measure a time required until receipt of a response message from the MFP 50, thereby determining the communication speed.

Further, in the aforementioned second illustrative embodiment, after completion of S7 or S9, the printer driver 28 performs S23. Nonetheless, for instance, after completion of S7 or S9, the printer driver 28 may determine whether to perform S29. In this case, when determining to perform S29, the printer driver 28 may perform S23 and the following steps. Specifically, for instance, the user may previously set whether to cause the printer driver 28 to perform S29. In this case, the printer driver 28 may determine whether to perform S29, based on the user's setting.

Further, in the aforementioned illustrative embodiments, the printing systems 1A and 1B (see FIGS. 1 and 2) are cited as examples of a "system" according to aspects of the present disclosure. Nonetheless, for instance, a system according to aspects of the present disclosure may include two or more PCs and two or more MFPs. Further, in the aforementioned illustrative embodiments, the scanner I/F 82A, the remote setup I/F 83A, and the SNMP I/F 74A are cited as examples of a "first interface" of an "information processing device" according to aspects of the present disclosure. Nonetheless, other interfaces complying with different protocols may be included in examples of the "first interface" of the "information processing device" according to aspects of the present disclosure. Further, contents of the preceding command to be transmitted in S9 are not limited to those as exemplified in the aforementioned illustrative embodiments. Any contents complying with the SNMP protocol may be included in the preceding command.

Further, in the aforementioned illustrative embodiments, the MFP 50 is exemplified as an "image forming apparatus" according to aspects of the present disclosure. Nonetheless, for instance, a printer having only the printing function may be included in examples of the "image forming apparatus" according to aspects of the present disclosure. In addition, exemplary printing methods are not limited to an inkjet method, but may include an electrophotographic method. When an electrophotographic image forming apparatus is employed, the preparation operations may include previously charging toner and heating a heater to raise a temperature of a fuser. Further, the exemplary printing methods may include a thermal transfer method or a thermosensitive method. In this case, the preparation operations may include raising a temperature of a built-in heat generator such as a heater.

In the aforementioned third illustrative embodiment, an association ID included in a preceding command and an association ID included in a print job received following the preceding command have been exemplified to be an identical numerical string. Nonetheless, the association ID included in the preceding command and the association ID included in the print job are not limited to the exemplified one but, for instance, may include at least an identical numerical string. Alternatively, each individual association ID may be generated in accordance with predefined rules to associate the preceding command and the print job with each other.

Further, in the aforementioned third illustrative embodiment, each association ID has been exemplified as a name of a user who is logging in to the PC 10. Nonetheless, for instance, to generate a plurality of print jobs for the same user, the printer driver 28 may generate association IDs in a manner distinguishable from each other, e.g., by adding respective different suffixes to the user name. Further, for instance, the printer program 59 may change the association IDs to be distinguishable from each other in accordance with a sequence in which preceding commands and the print jobs have been received.

Associations between elements exemplified in the aforementioned illustrative embodiment and elements according to aspects of the present disclosure will be exemplified below. The printing systems 1A and 1B may be included in examples of a "system" according to aspects of the present disclosure. The PC 10 may be an example of an "information processing device" according to aspects of the present disclosure. The MFP 50 may be an example of an "image forming apparatus" according to aspects of the present disclosure. The memory 14 may be an example of a "non-transitory computer-readable medium" according to aspects of the present disclosure. The printer driver 28 may be an example of "computer-readable instructions" stored in the "non-transitory computer-readable medium" according to aspects of the present disclosure. The CPU 12 may be an example of a "processor" coupled with the "information processing device" according to aspects of the present disclosure, and may be an example of a "first controller" according to aspects of the present disclosure. Further, the memory 14 storing the printer driver 28 may be included in the "first controller" according to aspects of the present disclosure. In other words, the CPU 12 executing the printer driver 28 stored in the memory 14 may be an example of the "first controller" according to aspects of the present disclosure. The network I/F 20 and the USB I/F 21 may be included in examples of a "physical communication interface" included in the "information processing device" according to aspects of the present disclosure, and may be included in examples of a "first physical communication interface" according to aspects of the present disclosure. The SNMP I/F 74A, the scanner I/F 82A, and the remote setup I/F 83A may be included in examples of a "first logical interface" included in the "physical communication interface" of the "information processing device" according to aspects of the present disclosure, and may be included in examples of a "first logical interface" included in the "first physical communication interface" according to aspects of the present disclosure. The Port 9100 I/F 71A, the LPR I/F 72A, the IPP I/F 73A, and the printer I/F 81A may be included in examples of a "second logical interface" included in the "physical communication interface" of the "information processing device" according to aspects of the present disclosure, and may be included in examples of a "second logical interface" included in the "first physical communication interface" according to aspects of the present disclosure. The printer 63 may be an example of an "image former" included in the "image forming apparatus" according to aspects of the present disclosure. The network I/F 51 and the USB I/F 57 may be included in examples of a "physical communication interface" included in the "image forming apparatus" according to aspects of the present disclosure, and may be included in examples of a "second physical communication interface" according to aspects of the present disclosure. The SNMP I/F 74B, the scanner I/F 82B, and the remote setup I/F 83B may be included in examples of a "first logical interface" included in the "physical communication interface" of the "image forming apparatus" according to aspects of the present disclosure, and may be included in examples of a "third logical interface" included in the "second physical communication interface" according to aspects of the present disclosure. The Port 9100 I/F 71B, the LPR I/F 72B, the IPP I/F 73B, and the printer I/F 81B may be included in examples of a "second logical interface" included in the "physical communication interface" of the "image forming apparatus" according to aspects of the present disclosure, and may be included in examples of a "fourth logical interface" included in the "second physical communication interface" according to aspects of the present disclosure. The CPU 52 may be an example of a "controller" included in the "image forming apparatus" according to aspects of the present disclosure, and may be an example of a "second controller" according to aspects of the present disclosure. Further, the memory 58 storing the printer program 59 may be included in the "controller" of the "image forming apparatus" according to aspects of the present disclosure, and may be included in the "second controller" according to aspects of the present disclosure. In other words, the CPU 52 executing the printer program 59 stored in the memory 58 may be an example of the "controller" included in the "image forming apparatus" according to aspects of the present disclosure, and may be an example of the "second controller" according to aspects of the present disclosure. The memory 58 may be an example of a "memory" included in the "image forming apparatus" according to aspects of the present disclosure. The input I/F 55 may be an example of an "operation interface" included in the "image forming apparatus" according to aspects of the present disclosure.

What is claimed is:

1. A non-transitory computer-readable medium storing computer-readable instructions that are executable by a processor coupled with an information processing device, the information processing device comprising a physical communication interface including a first logical interface and a second logical interface, the instructions being configured to, when executed by the processor, cause the information processing device to:

in response to receiving an image forming instruction from an operating system of the information processing device, generate preparation information instructing an image forming apparatus to perform a preparation operation, the preparation operation being an operation to be performed in advance of image formation based on a print job;

determine a particular time, the particular time being a period of time from when the image forming apparatus receives the preparation information until when the image forming apparatus starts the preparation operation;

transmit the generated preparation information including the particular time to the image forming apparatus via the first logical interface, the generated preparation information including the particular time instructing the image forming apparatus to wait the particular time after receiving the generated preparation information to start to perform the preparation operation; the first logical interface being configured to communicate data other than the print job;

generate the print job to be transmitted to the image forming apparatus via the second logical interface, in accordance with the image forming instruction; and transmit the print job to the image forming apparatus via the second logical interface, thereby preventing the preparation information transmitted via the first logical interface from being erroneously recognized as the print job.

2. The non-transitory computer-readable medium according to claim 1, wherein the instructions are further configured to, when executed by the processor, cause the information processing device to determine the particular time based on setting information included in the image forming instruction.

3. The non-transitory computer-readable medium according to claim 1, wherein the image forming apparatus is configured to be recognized as a multi-function apparatus having at least an image forming function and another function, by the information processing device, wherein the physical communication interface is a USB interface, wherein the first logical interface is configured to transmit data used for the another function different from the image forming function, and wherein the second logical interface is configured to transmit data used for the image forming function.

4. The non-transitory computer-readable medium according to claim 1, wherein the instructions are further configured to, when executed by the processor, cause the information processing device to:

in response to receiving the image forming instruction from the operating system of the information processing device, generate the preparation information including first identification information;

transmit the generated preparation information to the image forming apparatus via the first logical interface; and generate the print job including second identification information corresponding to the first identification information, in accordance with the image forming instruction.

5. A non-transitory computer-readable medium storing computer-readable instructions that are executable by a processor coupled with an information processing device, the information processing device comprising a physical communication interface including a first logical interface and a second logical interface, the instructions being configured to, when executed by the processor, cause the information processing device to:

in response to receiving an image forming instruction from an operating system of the information processing device, generate preparation information instructing an image forming apparatus to perform a preparation operation, the preparation operation being an operation to be performed in advance of image formation based on a print job;

determine a specific time, the specific time being a period of time from when the image forming apparatus is brought from a first state into a second state after completing the preparation operation until when the image forming apparatus returns into the first state;

transmit the preparation information including the specific time, to the image forming apparatus via the first logical interface, the preparation information including the specific time instructing the image forming apparatus to return to the first state after a lapse of the specific time after completing the preparation operation, the first logical interface being configured to communicate data other than the print job;

generate the print job to be transmitted to the image forming apparatus via the second logical interface, in accordance with the image forming instruction; and transmit the print job to the image forming apparatus via the second logical interface, thereby preventing the preparation information transmitted via the first logical interface from being erroneously recognized as the print job.

6. The non-transitory computer-readable medium according to claim 5, wherein the instructions are further configured to, when executed by the processor, cause the information processing device to determine the specific time based on a type of the physical communication interface.

7. A non-transitory computer-readable medium storing computer-readable instructions that are executable by a processor coupled with an information processing device, the information processing device comprising a physical communication interface including a first logical interface and a second logical interface, the instructions being configured to, when executed by the processor, cause the information processing device to:

in response to receiving an image forming instruction from an operating system of the information processing device, generate preparation information instructing an image forming apparatus to perform a preparation operation, the preparation operation being an operation to be performed in advance of image formation based on a print job;

transmit the generated preparation information to the image forming apparatus via the first logical interface, the first logical interface being configured to communicate data other than the print job;

generate the print job to be transmitted to the image forming apparatus via the second logical interface, in accordance with the image forming instruction; and transmit the print job to the image forming apparatus via the second logical interface, thereby preventing the preparation information transmitted via the first logical interface from being erroneously recognized as the print job;

determine whether the preparation information has been successfully transmitted to the image forming apparatus; and in response to determining that the preparation information has not been successfully transmitted to the image forming apparatus, generate a job containing the preparation information to be transmitted to the image forming apparatus via the second logical interface.

8. An image forming apparatus comprising:
an image former configured to perform image formation based on a print job;
a memory having a management information base (MIB) to store management information for managing settings or a state of the image forming apparatus;
a physical communication interface including:
   a first logical interface configured to communicate data other than the print job; and
   a second logical interface configured to communicate the print job; and
a controller configured to:
   in response to receiving preparation information including first identification information from an information processing device via the first logical interface, cause the image former to perform a preparation operation, the preparation operation being an operation to be performed in advance of the image formation;
   store the first identification information included in the received preparation information into the memory;
   receive the print job via the second logical interface, thereby preventing the preparation information via the first logical interface from being erroneously recognized as the print job;
   in response to receiving the print job including second identification information from the information processing device via the second logical interface, cause the image former to perform the image formation based on the received print job;
   after completion of the image formation, determine whether the first identification information corresponding to the second identification information included in the print job is stored in the memory; and
   in response to determining that the first identification information corresponding to the second identification information included in the print job is stored in the memory, delete the first identification information from the memory,
wherein the information processing device is configured to transmit, as the preparation information, an instruction to write the first identification information into the storage area, using a specified protocol, the particular protocol being an SNMP protocol, the preparation information being transmitted as an instruction to write the management information on the preparation operation into the MIB, and
wherein the controller is further configured to:
   in response to receiving the preparation information from the information processing device via the first logical interface, write the first identification information included in the received preparation information into the storage area, and cause the image former to perform the preparation operation.

9. The image forming apparatus according to claim 8, further comprising a non-transitory computer-readable medium storing computer-readable instructions that are executable by a processor coupled with an information processing device, the information processing device comprising a physical communication interface including a first logical interface and a second logical interface, the instructions being configured to, when executed by the processor, cause the information processing device to:
   in response to receiving an image forming instruction from an operating system of the information processing device, generate preparation information instructing the image forming apparatus to perform a preparation operation, the preparation operation being an operation to be performed in advance of image formation based on a print job;
   transmit the generated preparation information to the image forming apparatus via the first logical interface, the first logical interface being configured to communicate data other than the print job;
   transmit the generated preparation information to the image forming apparatus via the first logical interface with a particular protocol, the particular protocol being an SNMP protocol, the first logical interface being configured to communicate data other than the print job, the preparation information being transmitted as an instruction to write management information on the preparation operation into a specified address of a memory of the image forming apparatus, the memory having a management information base (MIB) to store the management information, the specified address being an address to store the management information in the MIB;
   generate the print job to be transmitted to the image forming apparatus via the second logical interface, in accordance with the image forming instruction; and
   transmit the print job to the image forming apparatus via the second logical interface, thereby preventing the preparation information transmitted via the first logical interface from being erroneously recognized as the print job,
wherein the image forming apparatus is configured to, in response to receiving the generated preparation information, write the management information into the specified address of the MIB and perform the preparation operation in accordance with the management information written in the specified address of the MIB.

10. The image forming apparatus according to claim 8, wherein the controller is further configured to:
   in response to a lapse of a particular period of time since storing the first identification information or the second identification information into the memory, delete the first identification information or the second identification information from the memory.

11. The image forming apparatus according to claim 8, wherein the controller comprises:
   a processor; and
   a memory storing processor-executable instructions configured to, when executed by the processor, cause the processor to:
      in response to receiving the preparation information via the first logical interface, cause the image former to perform the preparation operation; and
      in response to receiving the print job via the second logical interface, cause the image former to perform the image formation based on the received print job.

12. An image forming apparatus comprising:
an image former configured to perform image formation based on a print job;
a memory;
a physical communication interface including:

a first logical interface configured to communicate data other than the print job; and
a second logical interface configured to communicate the print job; and
a controller configured to:
in response to receiving preparation information including first identification information from an information processing device via the first logical interface, cause the image former to perform a preparation operation, the preparation operation being an operation to be performed in advance of the image formation;
store the first identification information included in the received preparation information into the memory;
receive the print job via the second logical interface, thereby preventing the preparation information via the first logical interface from being erroneously recognized as the print job;
in response to receiving the print job including second identification information from the information processing device via the second logical interface, cause the image former to perform the image formation based on the received print job;
after completion of the image formation, determine whether the first identification information corresponding to the second identification information included in the print job is stored in the memory;
in response to determining that the first identification information corresponding to the second identification information included in the print job is stored in the memory, delete the first identification information from the memory;
in response to determining that the first identification information corresponding to the second identification information included in the print job for the completed image formation is not stored in the memory, store the second identification information included in the print job for the completed image formation into the memory;
in response to receiving another piece of preparation information including first identification information via the first logical interface, determine whether the second identification information corresponding to the first identification information included in the received another piece of preparation information is stored in the memory; and
in response to determining that the second identification information corresponding to the first identification information included in the received another piece of preparation information is stored in the memory, discard the received another piece of preparation information.

13. An image forming apparatus comprising:
an image former configured to perform image formation based on a print job;
a memory;
a physical communication interface including:
a first logical interface configured to communicate data other than the print job; and
a second logical interface configured to communicate the print job; and
a controller configured to:
in response to receiving preparation information including first identification information from an information processing device via the first logical interface, cause the image former to perform a preparation operation, the preparation operation being an operation to be performed in advance of the image formation;
store the first identification information included in the received preparation information into the memory;
receive the print job via the second logical interface, thereby preventing the preparation information via the first logical interface from being erroneously recognized as the print job;
in response to receiving the print job including second identification information from the information processing device via the second logical interface, cause the image former to perform the image formation based on the received print job;
after completion of the image formation, determine whether the first identification information corresponding to the second identification information included in the print job is stored in the memory;
in response to determining that the first identification information corresponding to the second identification information included in the print job is stored in the memory, delete the first identification information from the memory;
after accepting a cancelling operation via the operation interface, accept selection of the first identification information stored in the memory and discard the print job including the second identification information corresponding to the selected first identification information, without causing the image former to perform image formation based on the print job.

14. A system comprising:
an image forming apparatus configured to perform image formation based on a print job; and
an information processing device comprising:
a first physical communication interface including:
a first logical interface configured to communicate data other than the print job; and
a second logical interface configured to communicate the print job;
a first controller configured to:
in response to receiving an image forming instruction from an operating system of the information processing device, generate preparation information including first identification information instructing the image forming apparatus to perform a preparation operation, the preparation operation being an operation to be performed in advance of the image formation;
transmit the generated preparation information including first identification information to the image forming apparatus via the first logical interface;
generate the print job including second identification information corresponding to the first identification information to be transmitted to the image forming apparatus via the second logical interface, in accordance with the image forming instruction, and
transmit the print job to the image forming apparatus via the second logical interface, thereby preventing the preparation information transmitted via the first logical interface from being erroneously recognized as the print job
wherein the image forming apparatus comprises:
an image former;
a memory;
a second physical communication interface including:

a third logical interface configured to communicate data other than the print job; and
a fourth logical interface configured to communicate the print job; and a second controller configured to:
  in response to receiving the preparation information including the first identification information from the information processing device via the third logical interface, cause the image forming apparatus to perform the preparation operation;
  store the first identification information included in the received preparation information into the memory; and
  in response to receiving the print job including the second identification information from the information processing device via the fourth logical interface, cause the image former to perform the image formation based on the received print job,
  after completion of the image formation, determine whether the first identification information corresponding to the second identification information included in the print job is stored in the memory;
  in response to determining that the first identification information corresponding to the second identification information included in the print job is stored in the memory, delete the first identification information from the memory,
  in response to determining that the first identification information corresponding to the second identification information included in the print job for the completed image formation is not stored in the memory, store the second identification information included in the print job for the completed image formation into the memory;
  in response to receiving another piece of preparation information including first identification information via the first logical interface, determine whether the second identification information corresponding to the first identification information included in the received another piece of preparation information is stored in the memory; and
  in response to determining that the second identification information corresponding to the first identification information included in the received another piece of preparation information is stored in the memory, discard the received another piece of preparation information.

* * * * *

UNITED STATES PATENT AND TRADEMARK OFFICE
CERTIFICATE OF CORRECTION

PATENT NO. : 11,055,045 B2
APPLICATION NO. : 16/291116
DATED : July 6, 2021
INVENTOR(S) : Kazutaka Yamada et al.

Page 1 of 1

It is certified that error appears in the above-identified patent and that said Letters Patent is hereby corrected as shown below:

In the Claims

Column 31, Claim 14, Line 13 should read:
memory;

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*